(12) United States Patent
Kim et al.

(10) Patent No.: US 12,288,492 B2
(45) Date of Patent: Apr. 29, 2025

(54) METHOD FOR REDUCING DETERIORATION OF DISPLAY OF ELECTRONIC DEVICE, AND FOLDABLE ELECTRONIC DEVICE USING METHOD

(71) Applicant: SAMSUNG ELECTRONICS CO., LTD., Suwon-si (KR)

(72) Inventors: Minseung Kim, Suwon-si (KR); Sangheon Kim, Suwon-si (KR); Changrae Lee, Suwon-si (KR); Jinwan An, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 17/510,835

(22) Filed: Oct. 26, 2021

(65) Prior Publication Data

US 2022/0044607 A1 Feb. 10, 2022

Related U.S. Application Data

(63) Continuation of application No. PCT/KR2020/015570, filed on Nov. 9, 2020.

(30) Foreign Application Priority Data

Feb. 7, 2020 (KR) .................. 10-2020-0015264

(51) Int. Cl.
*G09G 3/00* (2006.01)
*G06F 1/16* (2006.01)

(52) U.S. Cl.
CPC .......... *G09G 3/007* (2013.01); *G06F 1/1616* (2013.01); *G06F 1/1677* (2013.01); *G09G 2320/046* (2013.01)

(58) Field of Classification Search
CPC .............. G09G 3/007; G09G 2323/046; G06F 1/1616; G06F 1/1677
See application file for complete search history.

(56) References Cited

U.S. PATENT DOCUMENTS 9,715,742 B2 7/2017 Hwang et al.
9,824,631 B2 11/2017 Yamazaki et al.
(Continued)

FOREIGN PATENT DOCUMENTS

CN 110012153 7/2019
CN 110619819 12/2019
(Continued)

OTHER PUBLICATIONS

Extended Search Report and Written Opinion issued Jul. 11, 2022 in counterpart European Patent Application No. 20917859.9.
(Continued)

*Primary Examiner* — Yassin Alata
(74) *Attorney, Agent, or Firm* — NIXON & VANDERHYE P.C.

(57) ABSTRACT

Disclosed is a method for reducing degradation of a display of an electronic device, the method including: determining whether the display is in a low-power display mode for displaying an always on display (AOD) screen, identifying content of a first screen displayed on the display based on the display displaying the AOD screen, detecting a folding angle of the display, generating a second screen by reorganizing the first screen based on the folding angle, and displaying the second screen on the display.

17 Claims, 25 Drawing Sheets

(56) References Cited

U.S. PATENT DOCUMENTS

| | | | |
|---|---|---|---|
| 10,133,394 B2 | 11/2018 | Kim et al. | |
| 10,319,298 B2 | 6/2019 | Yamazaki et al. | |
| 10,803,785 B2 | 10/2020 | Hong et al. | |
| 11,164,285 B2 | 11/2021 | Kim et al. | |
| 11,423,866 B2 | 8/2022 | Park et al. | |
| 2007/0109284 A1 | 5/2007 | Yamazaki et al. | |
| 2008/0225181 A1* | 9/2008 | Kamada | H04N 21/41407 375/E7.076 |
| 2013/0182001 A1 | 7/2013 | Hwang et al. | |
| 2014/0361959 A1 | 12/2014 | Yamazaki et al. | |
| 2015/0339980 A1 | 11/2015 | Yamazaki et al. | |
| 2016/0034047 A1* | 2/2016 | Lee | H04M 1/72427 345/156 |
| 2016/0321969 A1 | 11/2016 | Kambhatla | |
| 2017/0097715 A1 | 4/2017 | Kim et al. | |
| 2018/0025468 A1 | 1/2018 | Kim et al. | |
| 2019/0189048 A1 | 6/2019 | Hong et al. | |
| 2021/0225331 A1* | 7/2021 | Park | G09G 5/38 |

FOREIGN PATENT DOCUMENTS

| | | |
|---|---|---|
| KR | 10-2013-0066202 | 6/2013 |
| KR | 10-2013-0103748 | 9/2013 |
| KR | 10-2016-0000110 | 1/2016 |
| KR | 10-2017-0117940 | 10/2017 |
| KR | 10-2019-0074861 | 6/2019 |
| KR | 10-2019-0106380 | 9/2019 |
| KR | 10-2019-0134370 | 12/2019 |
| WO | 2019/226025 | 11/2019 |

OTHER PUBLICATIONS

European Office Action dated Mar. 1, 2024 for EP Application No. 20917859.9.

Office Action for CN Application No. 202080039560.1 issued Jan. 21, 2025 and English translation, 17 pages.

* cited by examiner

METHOD FOR REDUCING DETERIORATION OF DISPLAY OF ELECTRONIC DEVICE, AND FOLDABLE ELECTRONIC DEVICE USING METHOD

CROSS-REFERENCE TO RELATED APPLICATIONS

This application is a bypass continuation of International Application No. PCT/KR2020/015570 designating the United States, filed on Nov. 9, 2020, in the Korean Intellectual Property Receiving Office and claiming priority to Korean Patent Application No. 10-2020-0015264, filed on Feb. 7, 2020, in the Korean Intellectual Property Office, the disclosures of which are incorporated by reference herein in their entireties.

BACKGROUND

Field

The disclosure relates to a technology for implementing a method for reducing degradation of a display of an electronic device and a foldable electronic device to which the method is applied.

Description of Related Art

An electronic device may display an image through a display disposed on a surface of a housing. A plurality of pixels for displaying the image may be disposed in the display. Each of the plurality of pixels may receive, from a display driver IC (DDI), a data voltage and an emission signal for displaying the image.

Meanwhile, the electronic device may have an always on display (AOD) function of consistently displaying information, such as time, date, battery level, and notification, on the display with low power in the state in which a screen of the display is turned off. The AOD function may enable a user to identify information, such time, date, battery level, and notification, without turning on the screen of the display.

Recently, a foldable electronic device whose display can be folded has emerged. The foldable electronic device may display different screens on the display in a flat state and a folded state. The foldable electronic device may be switched to a low-power display mode in the folded state. The foldable electronic device may display an AOD screen in the low-power display mode.

When the electronic device consistently displays the same AOD screen on the display in the low-power display mode, a burn-in phenomenon may occur. When the burn-in phenomenon occurs, a residual image may remain on the display. To prevent the burn-in phenomenon, a processor of the electronic device may be configured to move the AOD screen on the display by a specified gap every specified period. However, when the foldable electronic device is in a folded state in the low-power display mode, it may not be easy to move the AOD screen on the display. Furthermore, in the case of displaying content that is likely to cause burn-in on the AOD screen, it may not be easy to reduce burn-in.

SUMMARY

Embodiments of the disclosure provide a method for reducing a burn-in phenomenon while displaying various AOD screens on a foldable electronic device for a specified period of time or more, and an electronic device to which the method is applied.

A method for reducing degradation of a display of an electronic device according to an example embodiment of the disclosure includes: determining whether the display is in a low-power display mode for displaying an always on display (AOD) screen, identifying content of a first screen displayed on the display based on the display displaying the AOD screen, detecting a folding angle of the display, generating a second screen by reorganizing the first screen based on the folding angle, and displaying the second screen on the display.

A foldable electronic device including a folded state, a flat state, and an intermediate state between the folded state and the flat state according to an example embodiment of the disclosure includes: a display configured to display a screen, a sensor module including at least one sensor configured to obtain a folding angle of the display, and a processor operatively connected with the display and the sensor module. The processor is configured to: determine whether the display is in a low-power display mode for displaying an always on display (AOD) screen, identify content of a first screen displayed on the display based on the display displaying the AOD screen, detect the folding angle of the display using the sensor module, generate a second screen by reorganizing the first screen based on the folding angle; and controlling the display to display the second screen on the display.

According to various example embodiments of the disclosure, the foldable electronic device may reorganize content of the AOD screen based on the folding angle of the display in the low-power display mode. As the folding angle of the display is changed, the foldable electronic device may display a new screen, thereby reducing burn-in of the display.

Furthermore, according to various example embodiments of the disclosure, the foldable electronic device may identify content displayed on the display and may reorganize a screen based on a degree of burn-in. When the degree of burn-in is greater than or equal to a specified degree, the foldable electronic device may dynamically change the displayed content, thereby reducing burn-in of the display.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described with reference to accompanying drawings. Accordingly, those of ordinary skill in the art will recognize that modifications, equivalents, and/or alternatives on the various example embodiments described herein can be variously made without departing from the scope and spirit of the disclosure.

Figure 1:
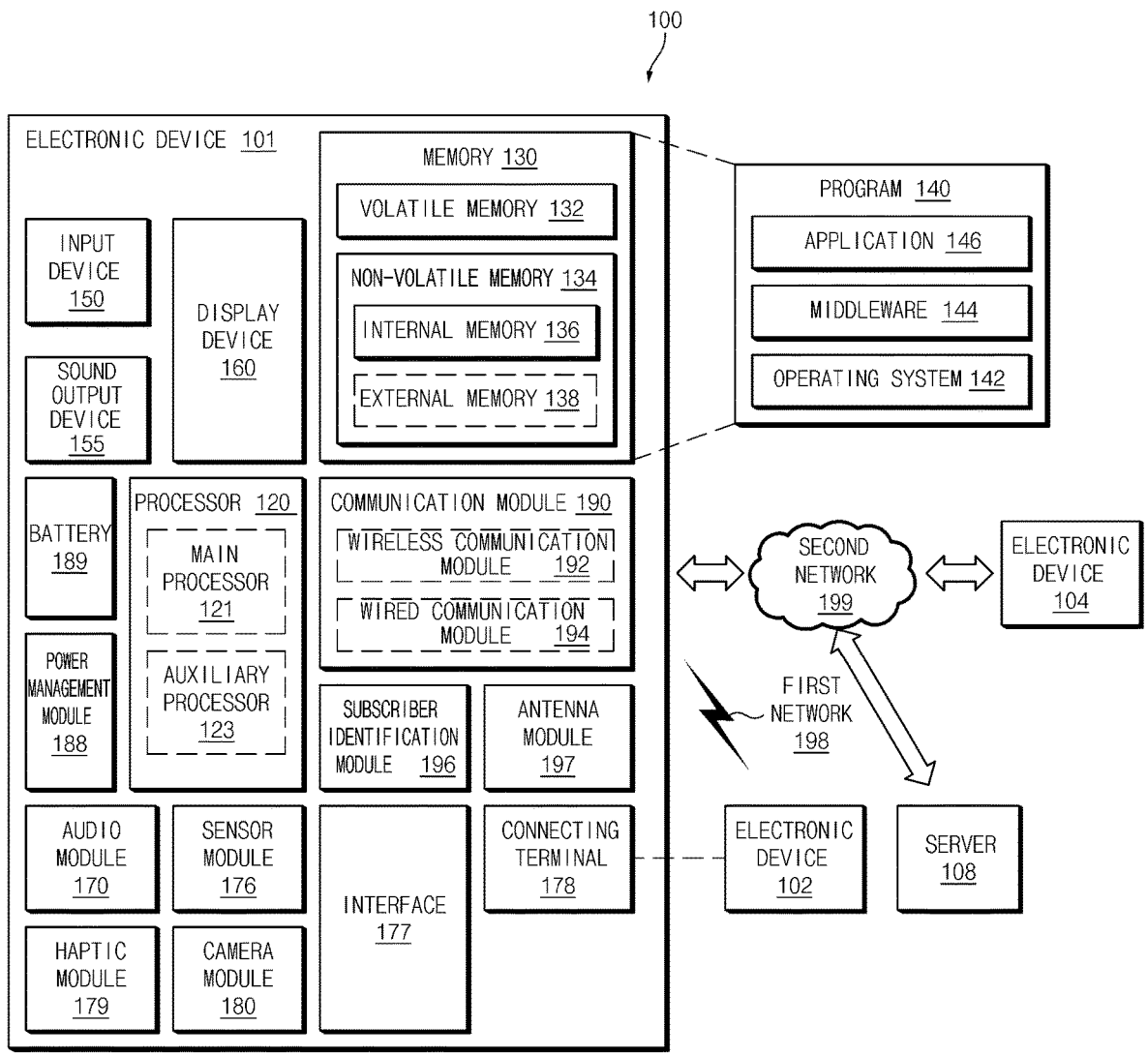
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
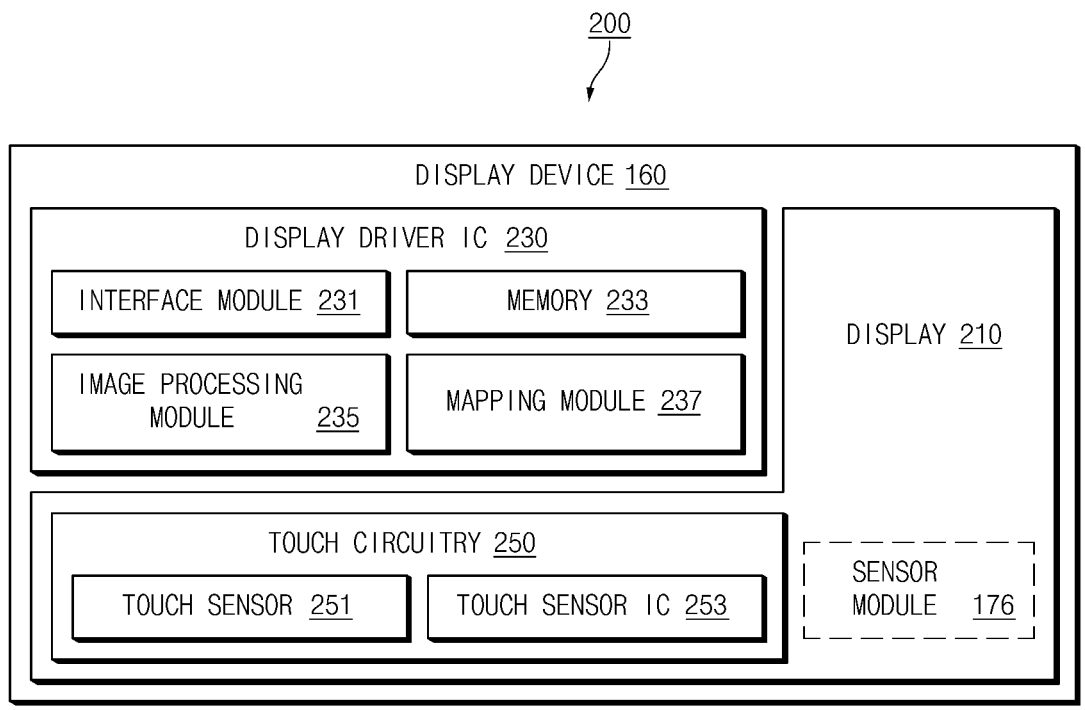
FIG. 2 is a block diagram illustrating an example display device according to various embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module (e.g., including interface circuitry) 231, memory 233 (e.g., buffer memory), an image processing module (e.g., including processing circuitry and/or executable program instructions) 235, and/or a mapping module (e.g., including processing circuitry and/or executable program instructions) 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module (e.g., including at least one sensor) 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
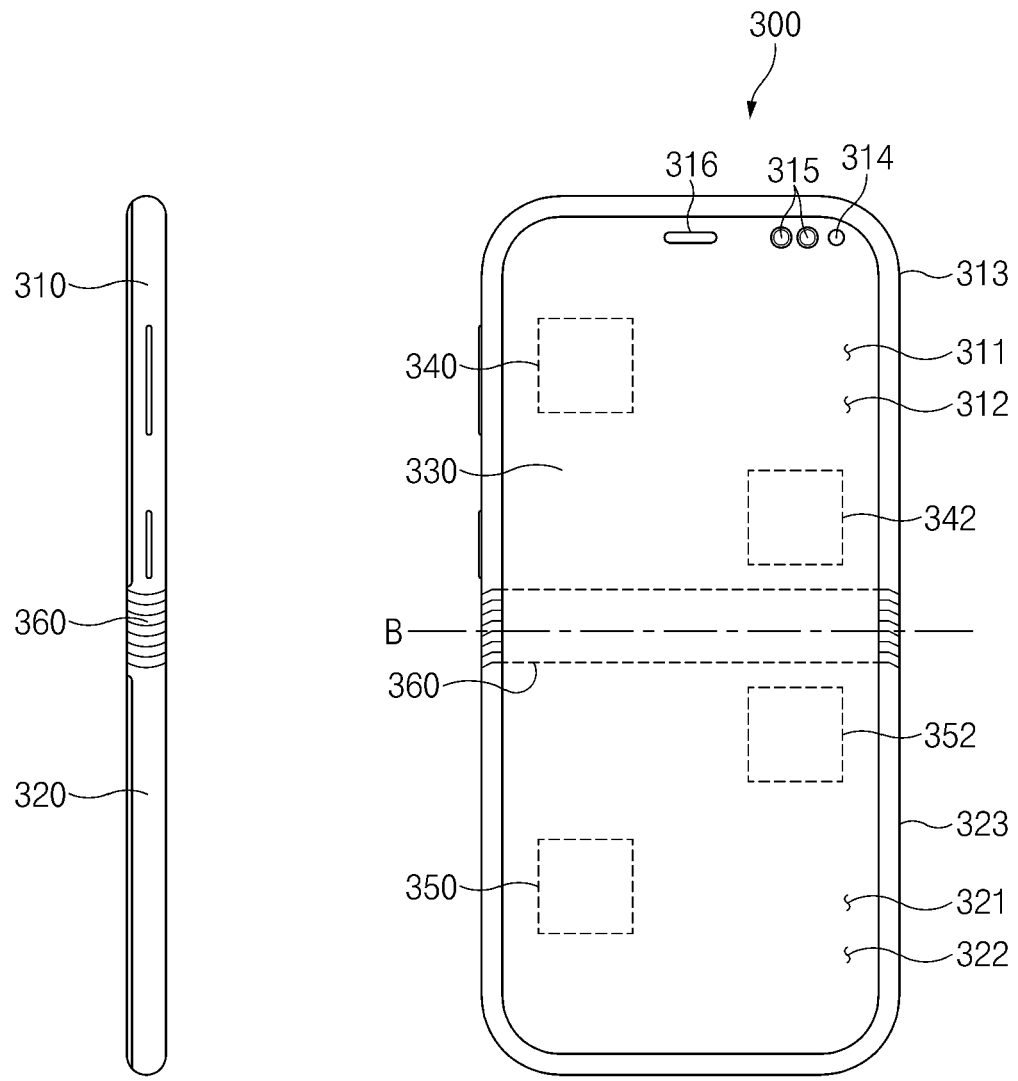
FIG. 3 is a diagram illustrating a flat state of an electronic device according to various embodiments.

FIG. 3 is a diagram 300 illustrating a flat state of an electronic device (e.g., the electronic device 101 of FIG. 1) according to various embodiments. The electronic device 101 according to the embodiment may include a first housing structure 310, a second housing structure 320, a hinge structure 360, and a display 330 (e.g., the display 210 of FIG. 2).

In an embodiment, the first housing structure 310 and the second housing structure 320 may be disposed on opposite sides with respect to a folding axis B. The first housing structure 310 and the second housing structure 320 may be coupled through the hinge structure 360 so as to be rotatable about the folding axis B. The first housing structure 310 and the second housing structure 320 may remain in a flat state, or may be folded relative to each other.

In an embodiment, the display 330 may be disposed in a space formed by the first housing structure 310 and the second housing structure 320. The display 330 may remain in a flat state, or may be folded about the folding axis B.

In an embodiment, in a flat state, the display 330 of the electronic device 101 may be configured in a first shape or a second shape. For example, the first shape may include a first screen aspect ratio (e.g., 4:3). In another example, the second shape may include a second screen aspect ratio (e.g., 16:9) different from the first screen aspect ratio 4:3.

In an embodiment, a camera 314 and a plurality of sensors 315 (e.g., the sensor module 176 of FIG. 1) may be disposed in at least one of the first housing structure 310 and the second housing structure 320. For example, as illustrated in FIG. 3, the camera 314 and the plurality of sensors 315 may be disposed in at least part of an upper area of the first housing structure 310. In another example, the camera 314 and at least a part of the plurality of sensors 315 may be disposed in at least a partial area of the first housing structure 310, and the rest of the plurality of sensors 315 may be disposed in at least a partial area of the second housing structure 320.

In an embodiment, the first housing structure 310 may include a first face 311 disposed to face toward a front side of the electronic device 101 in the flat state of the electronic device 101, a second face 312 facing away from the first face 311, and a first side member 313 surrounding at least part of a space between the first face 311 and the second face 312. The second housing 320 may include a third face 321 disposed to face toward the front side of the electronic device 101 in the flat state of the electronic device 101, a fourth face 322 facing away from the third surface 321, and a second side member 323 surrounding at least part of a space between the third face 321 and the fourth face 322.

In an embodiment, the camera 314 may be exposed on the front side of the electronic device 101 through an opening provided in one corner of the first housing structure 310. The camera 314 may take an image of an external environment. The camera 314 may generate image data corresponding to the external environment photographed.

In an embodiment, the plurality of sensors 315 may be exposed on the front side of the electronic device 101 through openings provided in one corner of the first housing structure 310 and/or the second housing structure 320, or may be disposed under at least a partial area of the display 330. The plurality of sensors 315 may include at least one of a proximity sensor, an illuminance sensor, an iris recognition sensor, an ultrasonic sensor, and/or an indicator. The plurality of sensors 315 may sense information related to the external environment and/or a user's biometric information. The plurality of sensors 315 may generate sensing data based on the sensed information.

In an embodiment, the first housing structure 310 may include a receiver 316 disposed through at least a partial area thereof. The receiver 316 may transmit, to the outside, voice and/or sound corresponding to audio data received by the electronic device 101 to enable the user to listen to the voice and/or sound. Although not illustrated in FIG. 3, an ear jack hole, an external speaker module, a SIM card tray, an interface connector port, and/or at least one key button may be additionally disposed in the first housing structure 310 and/or the second housing structure 320. According to an embodiment a first motion sensor 340 and a magnetic body (e.g., a magnet) 342 may be disposed in at least partial areas of the first housing structure 310. The first motion sensor 340 may be implemented by a combination of at least two of an acceleration sensor, an angular velocity sensor (e.g., a gyro sensor), and/or a terrestrial magnetism sensor. The first motion sensor 340 may sense a pose and a gesture of the first housing structure 310. For example, the pose of the first housing structure 310 may be sensed based on the acceleration sensor of the first motion sensor 340, and the gesture of the first housing structure 310 may be sensed based on the angular velocity sensor of the first motion sensor 340. The first motion sensor 340 may generate first motion data based on the sensed pose and gesture of the first housing structure 310. The first motion sensor 340 may transfer the generated first motion data to a processor (e.g., the processor 120 of FIG. 1) of the electronic device 101. The magnetic body 342 may be disposed in at least a portion of the first housing structure 310 that is adjacent to the hinge structure 360. The magnetic body 342 may radiate a magnetic force to the outside. The magnetic body 342 may be used to sense a relative positional relationship between the first housing structure 310 and the second housing structure 320.

In an embodiment, a second motion sensor 350 and a magnetic force sensor 352 may be disposed in at least partial areas of the second housing structure 320. The second motion sensor 350 may be implemented by a combination of at least two of an acceleration sensor, an angular velocity sensor, and/or a terrestrial magnetism sensor. The second motion sensor 350 may sense a pose and a gesture of the second housing structure 320. For example, the pose of the second housing structure 320 may be sensed based on the acceleration sensor of the second motion sensor 350, and the gesture of the second housing structure 320 may be sensed based on the angular velocity sensor of the second motion sensor 350. The second motion sensor 350 may generate second motion data based on the sensed pose and gesture of the second housing structure 320. The second motion sensor 350 may transfer the generated second motion data to the processor 120 of the electronic device 101. The magnetic force sensor 352 may be disposed in at least a portion of the second housing structure 320 that is adjacent to the hinge structure 360. The magnetic force sensor 352 may sense a magnetic force. The magnetic force sensor 352 may sense a relative positional relationship between the first housing structure 310 and the second housing structure 320 based on the sensed magnetic force. For example, the magnetic force sensor 352 may detect sensing data related to a folding angle of the first housing structure 310 and the second housing structure 320 based on the sensed magnetic force. The magnetic force sensor 352 may transfer the detected sensing data to the processor 120.

In an embodiment, the first motion sensor 340, the second motion sensor 350, and/or the magnetic force sensor 352 may include a six-axis sensor and/or a digital Hall IC sensor. The six-axis sensor and/or the digital Hall IC sensor may include hardware and software. The six-axis sensor and/or the digital Hall IC sensor may calculate raw data related to a folding angle of the first housing structure 310 and the second housing structure 320. The raw data related to the folding angle may be processed by a library of the processor

120. The processor 120 may calculate the folding angle of the first housing structure 310 and the second housing structure 320 by processing the raw data using the library implemented with a source code.

Figure 4:
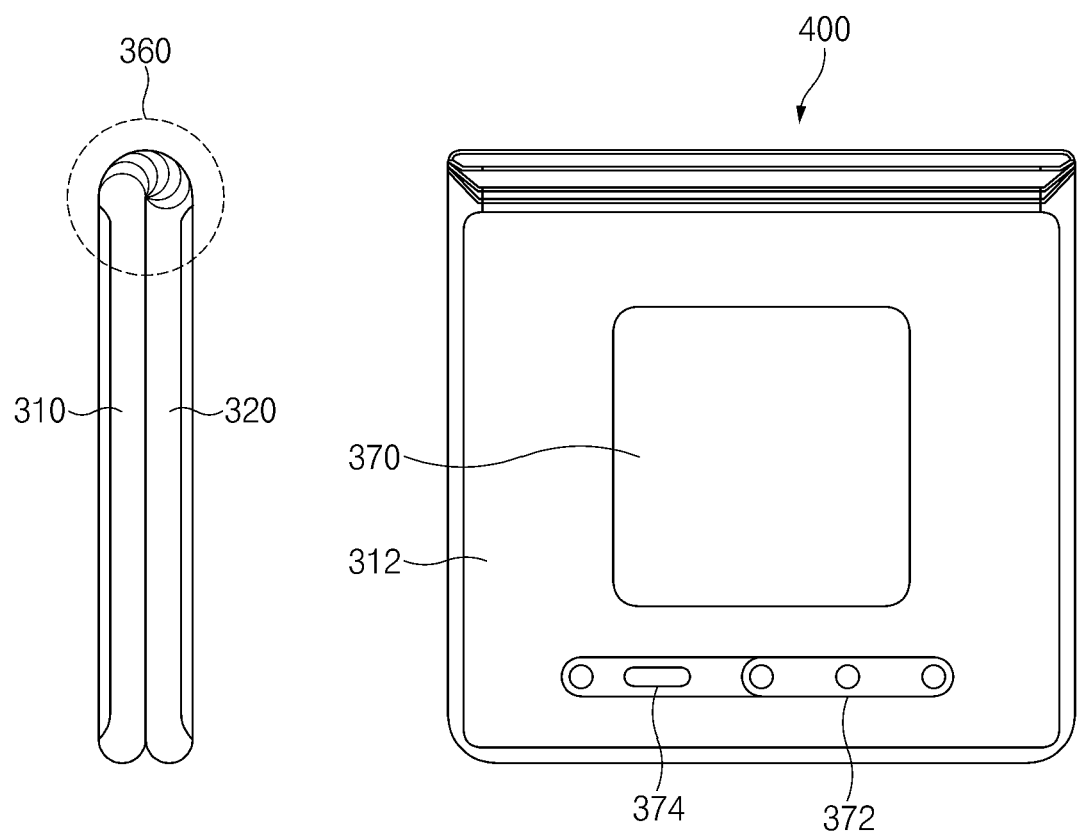
FIG. 4 is a diagram illustrating a folded state of the electronic device according to various embodiments.

FIG. 4 is a diagram 400 illustrating a folded state of the electronic device (e.g., the electronic device 101 of FIG. 1) according to various embodiments.

In an embodiment, one or more components may be disposed, or visually exposed, on a rear side of the electronic device 101. For example, one or more components or sensors including a rear camera device 372 and/or a proximity sensor 374 may be visually exposed through the second face 312 of the first housing structure 310. In another example, at least part of a sub-display 370 may be visually exposed through the second face 312 of the first housing structure 310.

In an embodiment, a magnetic body (e.g., the magnetic body 342 of FIG. 3) of the first housing structure 310 and a magnetic force sensor (e.g., the magnetic force sensor 352 of FIG. 3) of the second housing structure 320 may at least partially face each other in the folded state of the electronic device 101. The magnetic force sensor 352 may sense a change of a magnetic force radiated from the magnetic body 342 depending on a change to a flat state and/or a folded state.

In an embodiment, the angle and/or distance between the first housing structure 310 and the second housing structure 320 may vary depending on whether the electronic device 101 is in a flat state (e.g., the state of FIG. 3), a folded state (e.g., the state of FIG. 4), or an intermediate state (e.g., a state between the state of FIG. 3 and the state of FIG. 4).

Figure 5:
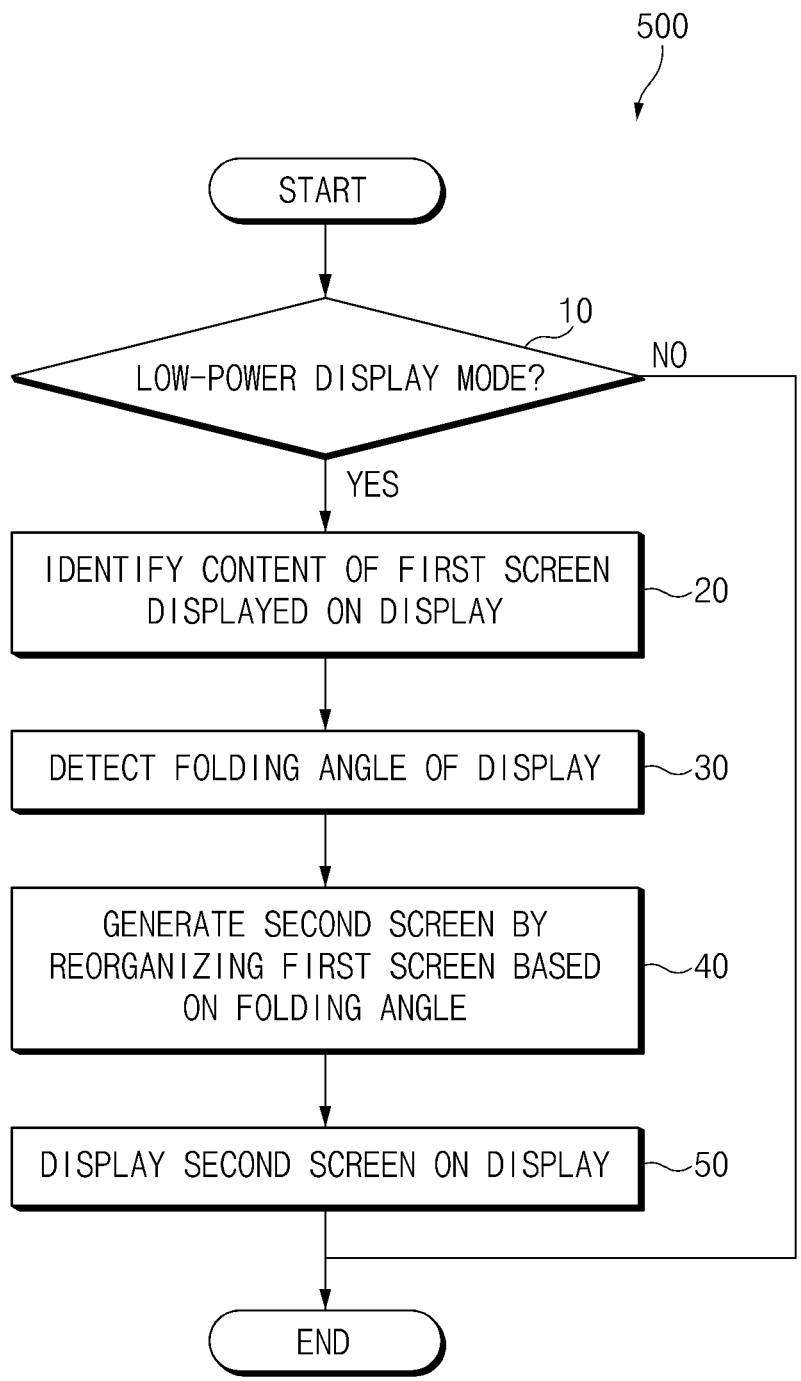
FIG. 5 is a flowchart illustrating an example method for reducing degradation of a display of an electronic device according to various embodiments.

FIG. 5 is a flowchart 500 illustrating an example method for reducing degradation of a display (e.g., the display 210 of FIG. 2) of an electronic device (e.g., the electronic device 101 of FIG. 1) according to various embodiments.

In operation 10, a processor (e.g., the processor 120 of FIG. 1) of the electronic device 101 according to the embodiment may determine whether the display 210 is in a low-power display mode. The processor 120 may determine whether the display 210 is in a low-power display mode for displaying an always on display (AOD) screen.

In an embodiment, the AOD screen may be a screen that consistently displays information, such as time, date, battery level, and notification, on the display 210 with low power in the state in which a screen of the display 210 is turned off. While the AOD screen is displayed, a user of the electronic device 101 may identify information, such as time, date, battery level, and notification, without turning on the screen of the display 210.

In an embodiment, when it is determined that the display 210 is in the low-power display mode (operation 10—Yes), the processor 120 may proceed to operation 20. When it is determined that the display 210 is in a general mode in which the screen is turned on (operation 20—No), the processor 120 may display a screen on the display 210 without proceeding to operation 20.

In operation 20, the processor 120 of the electronic device 101 according to the embodiment may identify content of a first screen displayed on the display 210. For example, when the display 210 displays the AOD screen, the processor 120 may identify the type and/or characteristics of content displayed on the AOD screen.

In operation 30, the processor 120 of the electronic device 101 according to the embodiment may detect a folding angle of the display 210. The processor 120 may receive first motion data and second motion data from a first motion sensor (e.g., the first motion sensor 340 of FIG. 3) and a second motion sensor (e.g., the second motion sensor 350 of FIG. 3). The processor 120 may receive sensing data related to a folding angle of the first housing structure 310 and the second housing structure 320 from a magnetic force sensor (e.g., the magnetic force sensor 352 of FIG. 3). The processor 120 may detect the folding angle of the display 210 based on the first motion data, the second motion data, and/or the sensing data received. The processor 120 may determine whether the folding angle of the display 210 is changed, by detecting the folding angle of the display 210 every specified period.

In operation 40, the processor 120 of the electronic device 101 according to the embodiment may generate a second screen by reorganizing the first screen based on the folding angle. To reduce degradation and/or burn-in of the display 210, the processor 120 may reorganize the content of the first screen to generate the second screen that causes degradation and/or burn-in of the display 210 to a lower degree than the first screen.

In an embodiment, the processor 120 may change the brightness, color, position, arrangement relationship, and/or size of the content of the first screen while maintaining the type and/or contents of the content of the first screen. For example, the processor 120 may change the font of text included in the AOD screen, may shift graphic content of the AOD screen by a specified gap, or may divide the graphic content and the text of the AOD screen from each other.

In an embodiment, the processor 120 may sense operating characteristics of the display 210 that vary depending on the folding angle of the display 210. For example, the processor 120 may sense the pixel per inch (ppi), dots per inch (dpi), brightness, resolution, and/or power consumption of the display 210 that vary depending on the folding angle of the display 210. The processor 120 may generate the second screen by changing display characteristics of the display 210 depending on the operating characteristics of the display 210.

In operation 50, the processor 120 of the electronic device 101 according to the embodiment may display the second screen on the display 210. The processor 120, when displaying the AOD screen, may reduce degradation and/or burn-in of the display 210 by displaying the second screen that contains content including substantially the same type and/or contents as the first screen and causes degradation and/or burn-in of the display 210 to a lower degree than the first screen. The second screen may be a screen obtained by changing the brightness, color, position, arrangement relationship, and/or size of the content of the first screen while maintaining the type and/or contents of the content of the first screen. The second screen may be a screen obtained by changing the average brightness and/or the maximum brightness to a specified threshold brightness value or less. The second screen may be a screen obtained by changing the size of the content of the AOD screen to a specified threshold value or less.

In an embodiment, the processor 120 may calculate the brightness, color, position, arrangement relationship, and/or size of the content of the first screen and may display the second screen obtained by changing the first screen, when it is determined that the degree to which the first screen causes degradation and/or burn-in is higher than or equal to a specified degree. For example, the processor 120 may change the font of the text included in the AOD screen to a thin font, may shift the gap between graphic content items of the AOD screen by a specified gap, or may divide and display the graphic content and the text of the AOD screen.

Figure 6:
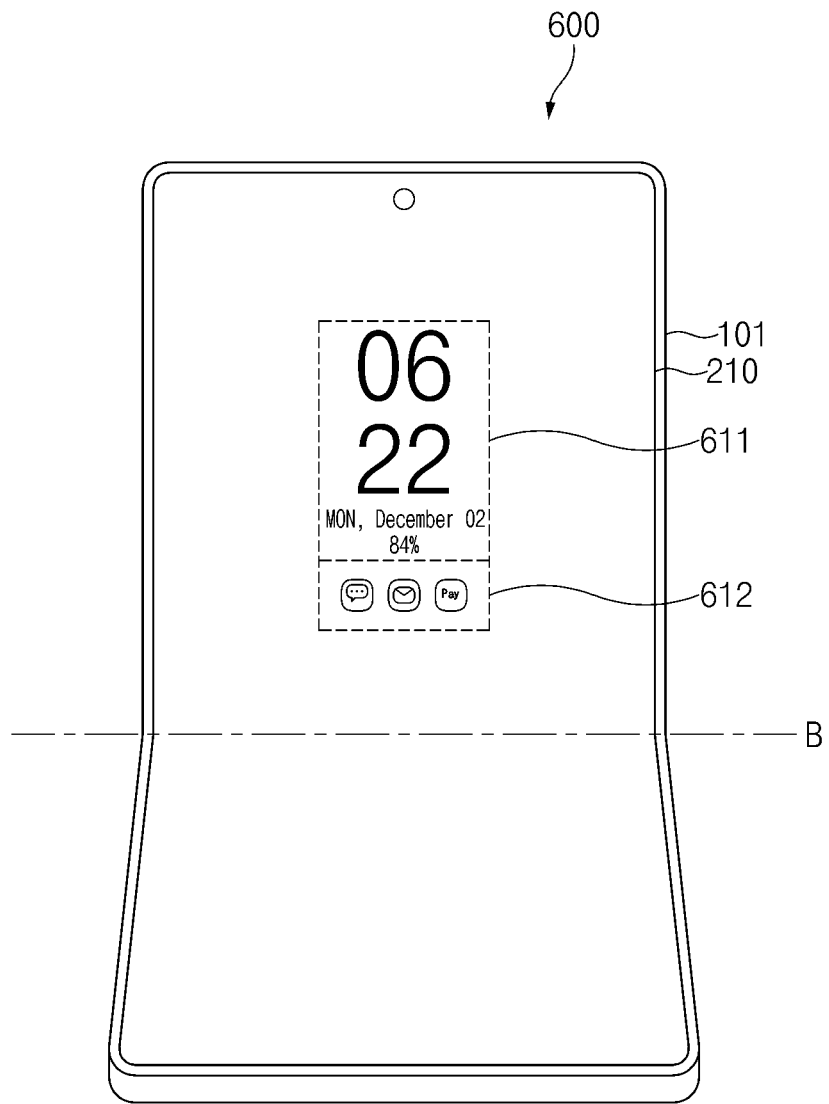
FIG. 6 is a diagram illustrating a low-power display mode of a display of an electronic device according to various embodiments.

FIG. 6 is a diagram 600 illustrating a low-power display mode of the display 210 of the electronic device 101 according to various embodiments.

In an embodiment, a processor (e.g., the processor 120 of FIG. 1) of the electronic device 101 may support an active state or a wake-up state in which a user is able to intensively use functions of the electronic device 101 and an inactive state or a sleep state in which the processor waits for the user to use the electronic device 101.

In an embodiment, in the active state or the wake-up state, the processor 120 may perform control such that a plurality of hardware modules and/or software modules included in the electronic device 101 operate in a general mode. The processor 120 may control a power management module (e.g., the power management module 188 of FIG. 1) such that the plurality of hardware modules and/or software modules receive rated power from a battery (e.g., the battery 189 of FIG. 1) in the general mode. In the general mode, the plurality of hardware modules and/or software modules may perform functions without limitations. For example, in the active state or the wake-up state, the processor 120 may perform control such that the display 210 receives rated power and is turned on to display an execution screen of an application (e.g., the application 146 of FIG. 1) or to receive a touch input of the user while maintaining a specified sensitivity.

In an embodiment, in the inactive state or the sleep state, the processor 120 may perform control such that the plurality of hardware modules and/or software modules included in the electronic device 101 operate in a low-power mode. The processor 120 may control the power management module 188 such that the plurality of hardware modules and/or software modules receive minimum power from the battery 189 in the low-power mode. In the low-power mode, the plurality of hardware modules and/or software modules may be deactivated, or may perform only specified limited functions. In the inactive state or the sleep state, the processor 120 may control the plurality of hardware modules and/or software modules such that the plurality of hardware modules and/or software modules perform only the limited functions. In the inactive state or the sleep state, by suppressing information processing or arithmetic operation of the plurality of hardware modules and/or software modules, the power consumptions of the plurality of hardware modules and/or software modules may be decreased, and the amount of time that the battery 189 is used may be increased. According to an embodiment, the processor 120 may control a display driver IC (e.g., the display driver IC 230 of FIG. 2) such that the display 210 operates in an inactive state or a sleep state in the low-power mode (or, operates in the low-power display mode). For example, the processor 120 may control the display driver IC 230 such that the display 210 outputs content, such as text and/or an image representing a digital clock, a date, and/or a battery state, on a first area 611 of the display 210 in the inactive state or the sleep state. In another example, the processor 120 may control the display driver IC 230 such that the display 210 outputs various types of graphic user interface (GUI) objects, such as icons, on a second area 612 of the display 210. The text, the image, and/or the GUI objects included in the first area 611 and the second area 612 may be included in an AOD screen.

In an embodiment, the text, the image, and/or the GUI objects included in the first area 611 and the second area 612 of the display 210 of the electronic device 101 that operates in the inactive state or the sleep state may be displayed in a specified first color (e.g., white). Pixels displaying the text, the image, and/or the GUI objects included in the first area 611 and the second area 612 may emit light in the first color. A background area other than the first area 611 and the second area 612 may be set to a second color (e.g., black). Pixels disposed in the background area may be configured to have the second color. For example, when the display 210 includes an organic light emitting diode (OLED) panel, the pixels disposed in the background area may be turned off.

According to an embodiment, the text, the image, and/or the GUI objects included in the first area 611 and the second area 612 of the display 210 may move upward and downward and/or leftward and rightward. The AOD screen may periodically or aperiodically move. In the case of moving the AOD screen, degradation and/or burn-in of the pixels displaying the text, the image, and/or the GUI objects in the first area 611 and the second area 612 may be reduced.

According to an embodiment, the display 210, while operating in the inactive state or the sleep state (or, operating in the low-power display mode), may sense a touch input of the user to the GUI objects included in the second area 612 while consuming minimum power. The processor 120 may switch the display 210 to the active state or the wake-up state when the touch input of the user to the GUI objects included in the second area 612 is sensed.

In an embodiment, the AOD screen may include a first object including text and/or an image that represents a clock, a date, and/or a battery state and a second object including notification received by the electronic device 101 or transferred to the user by the electronic device 101. The first object may be displayed on the first area 611. For example, the first object may be content such as the text and/or the image that represents the digital clock, the date, and/or the battery state displayed on the first area 611. The second object may be displayed on the second area 612. For example, the second object may be various types of GUI objects such as icons.

In an embodiment, the processor 120 may be configured to determine whether an event for switching the processor 120 to the sleep state occurs. The processor 120 may determine whether an event for a transition to the low-power display mode occurs. For example, when the low-power display mode is activated, the electronic device 101 may execute the low-power display mode as the processor 120 is switched to the sleep state. Accordingly, in FIG. 5, operation 10 of determining whether the display 210 is in the low-power display mode may include the operation of determining, by the processor 120 of the electronic device 101, whether the event for switching the processor 120 to the sleep state occurs.

Figure 7A:
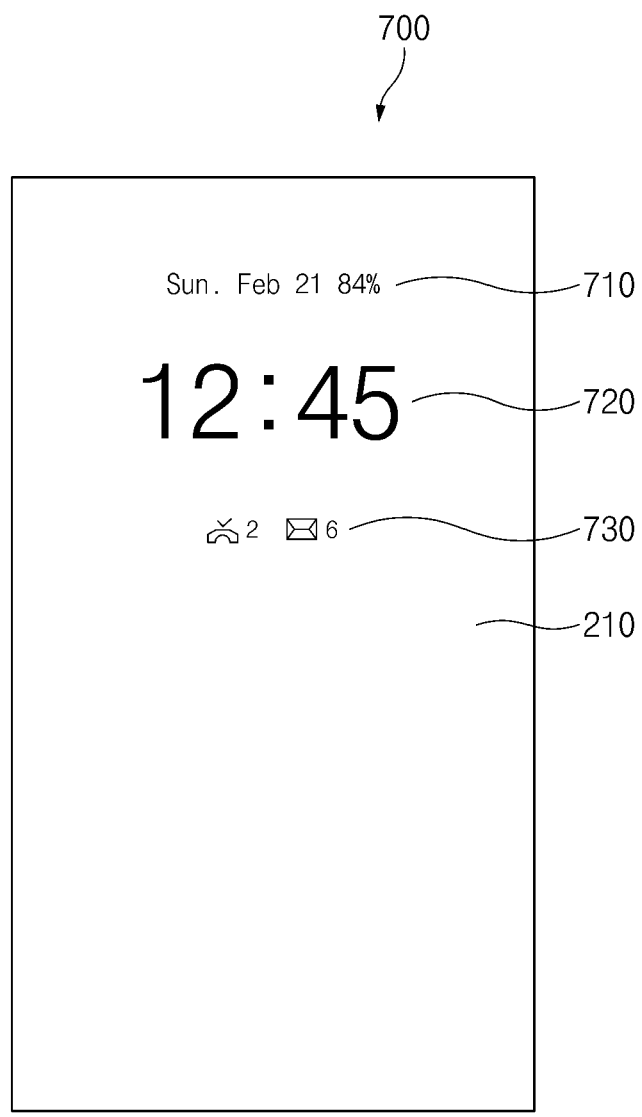
FIG. 7A is a diagram illustrating first content of a first screen displayed on a display in a low-power display mode according to various embodiments.

FIG. 7A is a diagram 700 illustrating example first content 710, 720, and 730 of a first screen displayed on the display 210 in a low-power display mode according to various embodiments.

In an embodiment, a processor (e.g., the processor 120 of FIG. 1) of an electronic device (e.g., the electronic device 101 of FIG. 1) may be configured to identify a list of running applications (e.g., the application 146 of FIG. 1). The processor 120 may identify the type and/or form of the first content 710, 720, and 730 displayed on the display 210 depending on the execution of the application 146. The processor 120 may identify the list of applications 146 when an event for a transition to the low-power display mode occurs. In FIG. 5, operation 20 of identifying the content of the first screen displayed on the display 210 may include the operation of identifying, by the processor 120 of the electronic device 101, the list of running applications.

In an embodiment, the processor 120 may display an AOD screen including the first content 710, 720, and 730 when the display 210 of the electronic device 101 faces a portrait orientation. The first content 710, 720, 730 may be content displayed to correspond to viewing in the portrait orientation. When the display 210 of the electronic device 101 faces the portrait orientation, the processor 120 may determine that the electronic device 101 is placed in the portrait orientation and therefore a user visually recognizes the display 210 in the portrait orientation.

In an embodiment, the first content 710, 720, and 730 of the AOD screen displayed on the display 210 may have various types and/or forms. For example, as illustrated in FIG. 7A, the first content 710, 720, and 730 of the AOD screen displayed on the display 210 may include a date and a battery level 710, a digital clock 720, and at least one notification icon 730. For example, the at least one notification icon 730 may include an icon for notifying of the number of missed calls and/or an icon for notifying of the number of received messages. In another example, the content of the AOD screen may include an analog clock, a world clock, a calendar, wallpaper, and/or an image. The processor 120 may receive, from a display driver IC (e.g., the display driver IC 230 of FIG. 2), information about the type, contents, and/or form of the first content 710, 720, and 730 of the AOD screen displayed on the display 210.

Figure 7B:
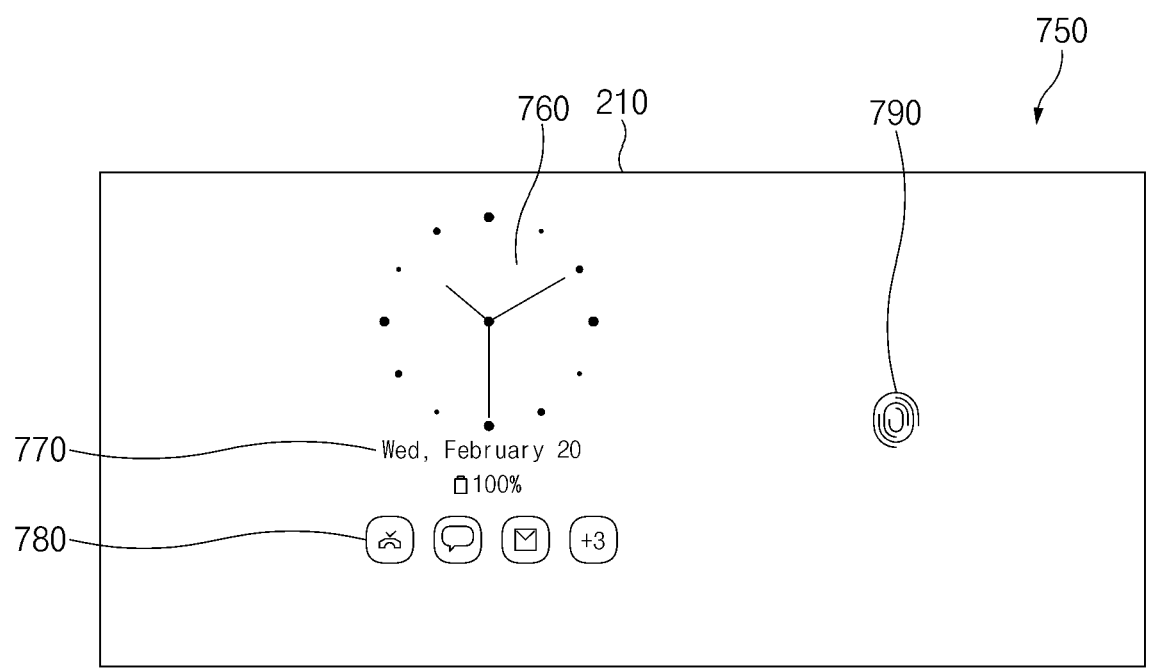
FIG. 7B is a diagram illustrating second content of a first screen displayed on a display in a low-power display mode according to various embodiments.

FIG. 7B is a diagram 750 illustrating second content 760, 770, 780, and 790 of a first screen displayed on the display 210 in a low-power display mode according to various embodiments.

In an embodiment, the processor 120 may display an AOD screen including the second content 760, 770, 780, and 790 when the display 210 of the electronic device 101 faces a landscape orientation. The second content 760, 770, 780, and 790 may be content displayed to correspond to viewing in the landscape orientation. When the display 210 of the electronic device 101 faces the landscape orientation, the processor 120 may determine that the electronic device 101 is placed in the landscape orientation and therefore a user visually recognizes the display 210 in the landscape orientation.

In an embodiment, the second content 760, 770, 780, and 790 of the AOD screen displayed on the display 210 may have various types and/or forms. For example, as illustrated in FIG. 7B, the second content 760, 770, 780, and 790 of the AOD screen displayed on the display 210 may include an analog clock 760, a date and a battery level 770, at least one notification icon 780, and a fingerprint recognition icon 790. In another example, content of the AOD screen may include a digital clock, a world clock, a calendar, wallpaper, and/or an image. The processor 120 may receive, from the display driver IC 230, information about the type, contents, and/or form of the second content 760, 770, 780, and 790 of the AOD screen displayed on the display 210.

Figure 8:
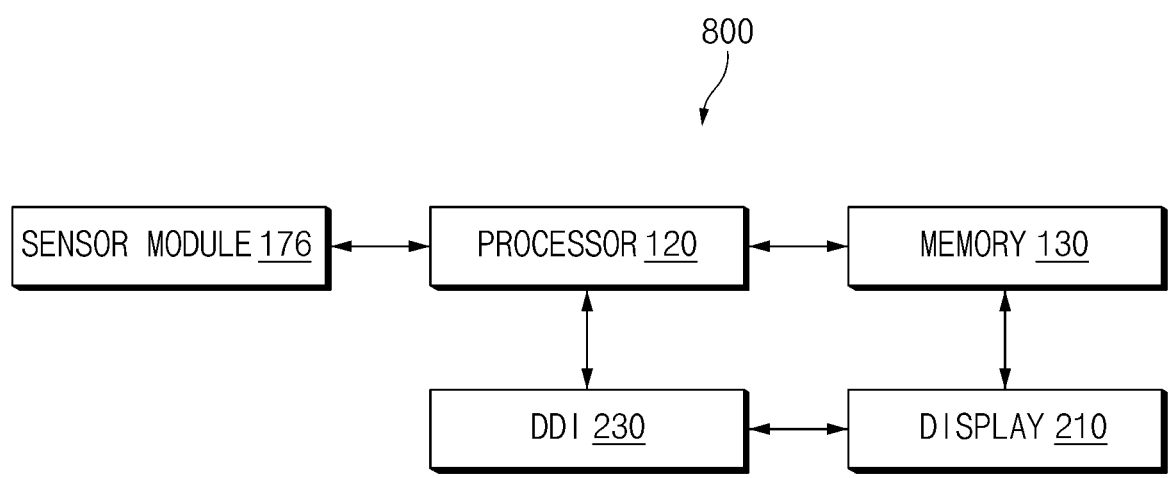
FIG. 8 is a block diagram illustrating components for detecting a folding angle of a display of an electronic device according to various embodiments.

FIG. 8 is a block diagram 800 illustrating components for detecting a folding angle of the display 210 of an electronic device (e.g., the electronic device 101 of FIG. 1) according to various embodiments. The electronic device 101 according to the embodiment may include a sensor module (e.g., including at least one sensor) 176, a processor (e.g., including processing circuitry) 120, a display driver integrated circuit (DDI) 230 (e.g., the display driver IC 230 of FIG. 2), the display 210, and a memory 130.

In an embodiment, the sensor module 176 may include at least one sensor and detect sensing data related to a folding angle of the display 210 that is an angle formed by opposite side portions of the display 210 at a folded portion when the display 210 is folded. For example, the sensor module 176 may obtain the sensing data from at least one of a motion sensor or a magnetic force sensor. The sensor module 176 may transfer the obtained sensing data to the processor 120. The processor 120 may include various processing circuitry and calculate the folding angle of the display 210 based on the sensing data. The processor 120 may periodically obtain the sensing data from at least one of the motion sensor or the magnetic force sensor included in the sensor module 176. The processor 120 may periodically determine whether the folding angle of the display 210 is changed, based on the sensing data. In FIG. 5, operation 30 of detecting the folding angle of the display 210 may include the operation of periodically obtaining, by the processor 120, the sensing data using the sensor module 176 including the motion sensor and/or the magnetic force sensor.

In an embodiment, based on a change of the sensing data, the processor 120 may calculate a change in the form of content displayed on the display 210 depending on a change of the folding angle. The processor 120 may calculate how the form of the content displayed to a user on the display 210 is changed when the folding angle is changed. In FIG. 5, operation 30 of detecting the folding angle of the display 210 may include the operation of calculating, by the processor 120, a change in the form of the content displayed on the display 210 in response to a change of the folding angle.

In an embodiment, the processor 120 may sense whether the electronic device 101 is in a flat state, a folded state, and/or an intermediate state, based on the sensing data. The processor 120 may sense whether the electronic device 101 is changed from one of the flat state, the folded state, and/or the intermediate state to another state. When a change in the state of the electronic device 101 is identified, the processor 120 may transfer information about a display area corresponding to a changed state of the electronic device 101 to an application (e.g., the application 146 of FIG. 1).

In an embodiment, when a change in the state of the electronic device 101 is identified based on the sensing data, the processor 120 may transfer information about a display area of the display 210 corresponding to a changed state of the electronic device 101 to an application 146, for which continuity is set, among the running applications 146. The processor 120 may compare first display area information of the display 210 depending on the previous state of the electronic device 101 and second display area information of the display 210 depending on the changed state of the electronic device 101. For example, when the state of the electronic device 101 is changed, the resolution of the content displayed on the display 210 may be changed. To notify of the change of the resolution based on the sensing data, the processor 120 may include information about the resolution of the content displayed on the display 210 in the first display area information and the second display area information and may store the information in the memory 130.

Figure 9:
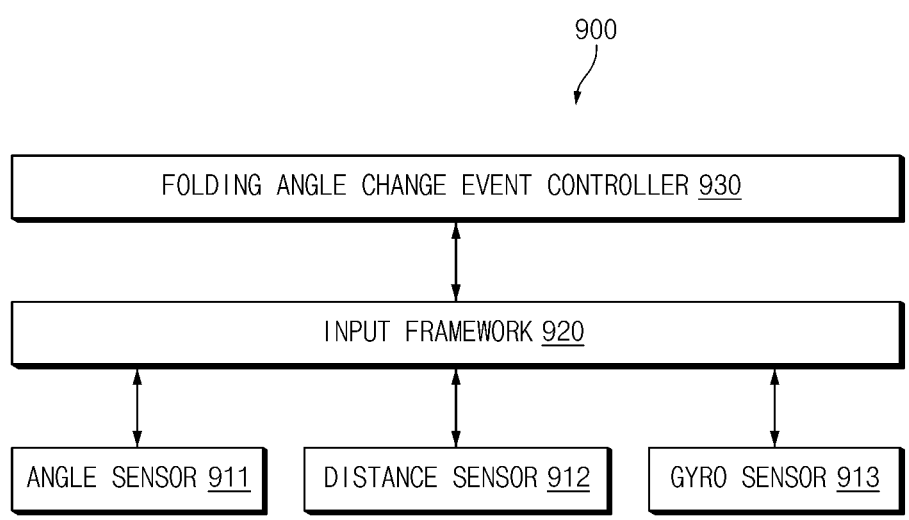
FIG. 9 is a block diagram illustrating components for detecting a folding angle of a display of an electronic device according to various embodiments.

FIG. 9 is a block diagram 900 illustrating components for detecting a folding angle of a display (e.g., the display 210 of FIG. 2) of an electronic device (e.g., the electronic device 101 of FIG. 1) according to various embodiments. The electronic device 101 according to the embodiment may include an angle sensor 911, a distance sensor 912, a gyro sensor 913, an input framework 920, and a folding angle change event controller 930.

In an embodiment, the angle sensor 911, the distance sensor 912, and the gyro sensor 913 may obtain sensing data related to the folding angle of the electronic device 101, the distance between a first housing structure (e.g., the first housing structure 310 of FIG. 3) and a second housing structure (e.g., the second housing structure 320 of FIG. 3), and the direction that the display (e.g., the display 210 of FIG. 2) faces. The angle sensor 911, the distance sensor 912, and the gyro sensor 913 may be connected with the input framework 920 through a sensor driver (not illustrated). The sensor driver (not illustrated) may be a software module for controlling the angle sensor 911, the distance sensor 912, and the gyro sensor 913. The angle sensor 911, the distance sensor 912, and the gyro sensor 913 may transfer the sensing data to the input framework 920.

In an embodiment, the input framework 920 may receive, from the angle sensor 911, the distance sensor 912, and the gyro sensor 913, the sensing data for measuring a flat state and/or a folded state of the electronic device 101. The input framework 920 may determine the flat state and/or the folded state of the electronic device 101, based on the sensing data. The input framework 920 may transfer information related to the state of the electronic device 101 to the folding angle change event controller 930. For example, the input framework 920 may transmit, to the folding angle change event controller 930, a first signal notifying that the electronic device 101 is in the flat state. In another example, the input framework 920 may transmit, to the folding angle change event controller 930, a second signal notifying that the electronic device 101 is in the folded state.

In an embodiment, the folding angle change event controller 930 may receive an event related to a change of the flat state and/or the folded state of the electronic device 10. The folding angle change event controller 930 may control turn-on and/or turn-off of the display 210 and a sub-display (e.g., the sub-display 370 of FIG. 4).

In an embodiment, the folding angle change event controller 930 may perform activation and/or deactivation of the display 210 and activation and/or deactivation of the sub-display 370, based on the state of the currently running application (e.g., the application 146 of FIG. 1), the policy stored in advance in a memory (e.g., the memory 130 of FIG. 1) to correspond to a state change of the electronic device 101, and/or the activation or deactivation permission state of the display 210.

Figure 10:
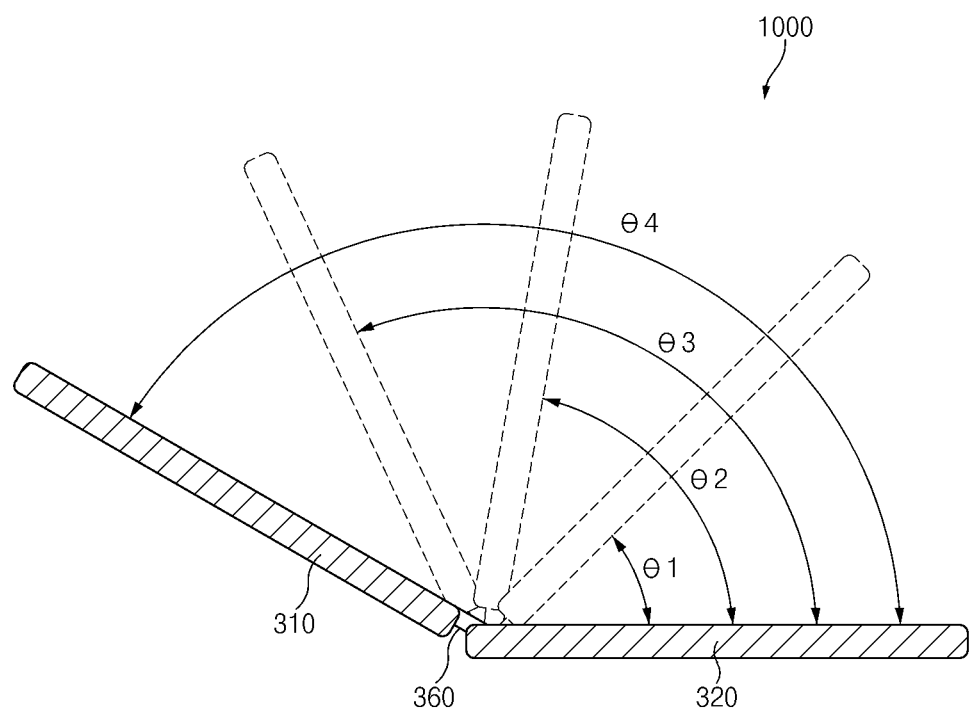
FIG. 10 is a diagram illustrating example change of a folding angle of a display of an electronic device according to various embodiments.

FIG. 10 is a diagram 1000 illustrating example change of a folding angle of a display (e.g., the display 210 of FIG. 2) of an electronic device (e.g., the electronic device 101 of FIG. 1) according to various embodiments.

In an embodiment, the first housing structure 310 and the second housing structure 320 of the electronic device 101 may be folded using the hinge structure 360 so as to face each other. The first housing structure 310 and the second housing structure 320 may have various folding angles, such as a first folding angle θ1, a second folding angle θ2, a third folding angle θ3, and a fourth folding angle θ4, with respect to the hinge structure 360. The first folding angle θ1, the second folding angle θ2, the third folding angle θ3, and the fourth folding angle θ4 may be angles not less than 0 degrees and not more than 180 degrees. For example, the first folding angle θ1 may be about 45 degrees, the second folding angle θ2 may be about 75 degrees, the third folding angle θ3 may be about 120 degrees, and the fourth folding angle θ4 may be about 150 degrees. The first folding angle θ1, the second folding angle θ2, the third folding angle θ3, and the fourth folding angle θ4 may represent a case where the electronic device 101 is in an intermediate state. When the folding angle is 0 degrees, the electronic device 101 may be in a folded state, and when the folding angle is 180 degrees, the electronic device 101 may be in a flat state. As the first housing structure 310 and the second housing structure 320 of the electronic device 101 are folded and unfolded, the display 210 may be folded and unfolded. The folding angle formed by the first housing structure 310 and the second housing structure 320 may be substantially the same as the folding angle of the display 210.

In an embodiment, as the folding angle of the display 210 is changed, the electronic device 101 may change an AOD screen displayed on the display 210. In an embodiment, to reduce degradation and/or burn-in of the display 210, the electronic device 101, when changing the AOD screen of the display 210, may change the AOD screen to an AOD screen that causes degradation and/or burn-in of the display 210 to a small degree.

In an embodiment, the display 210 of the electronic device 101 may have a foldable form-factor structure that is connected with the inside and displayed outside. The display 210 having a foldable form-factor structure may display the AOD screen through a portion other than portions folded while facing each other. For example, the display 210 having a foldable form-factor structure may display the AOD screen through an area exposed to the outside when the electronic device 101 is in a folded state. To reduce a phenomenon in which degradation and/or burn-in occurs in the display 210 that displays the AOD screen for a long period of time, a processor (e.g., the processor 120 of FIG. 1) may change display characteristics of the display 210 when the folding angle of the display 210 is changed.

Figure 11:
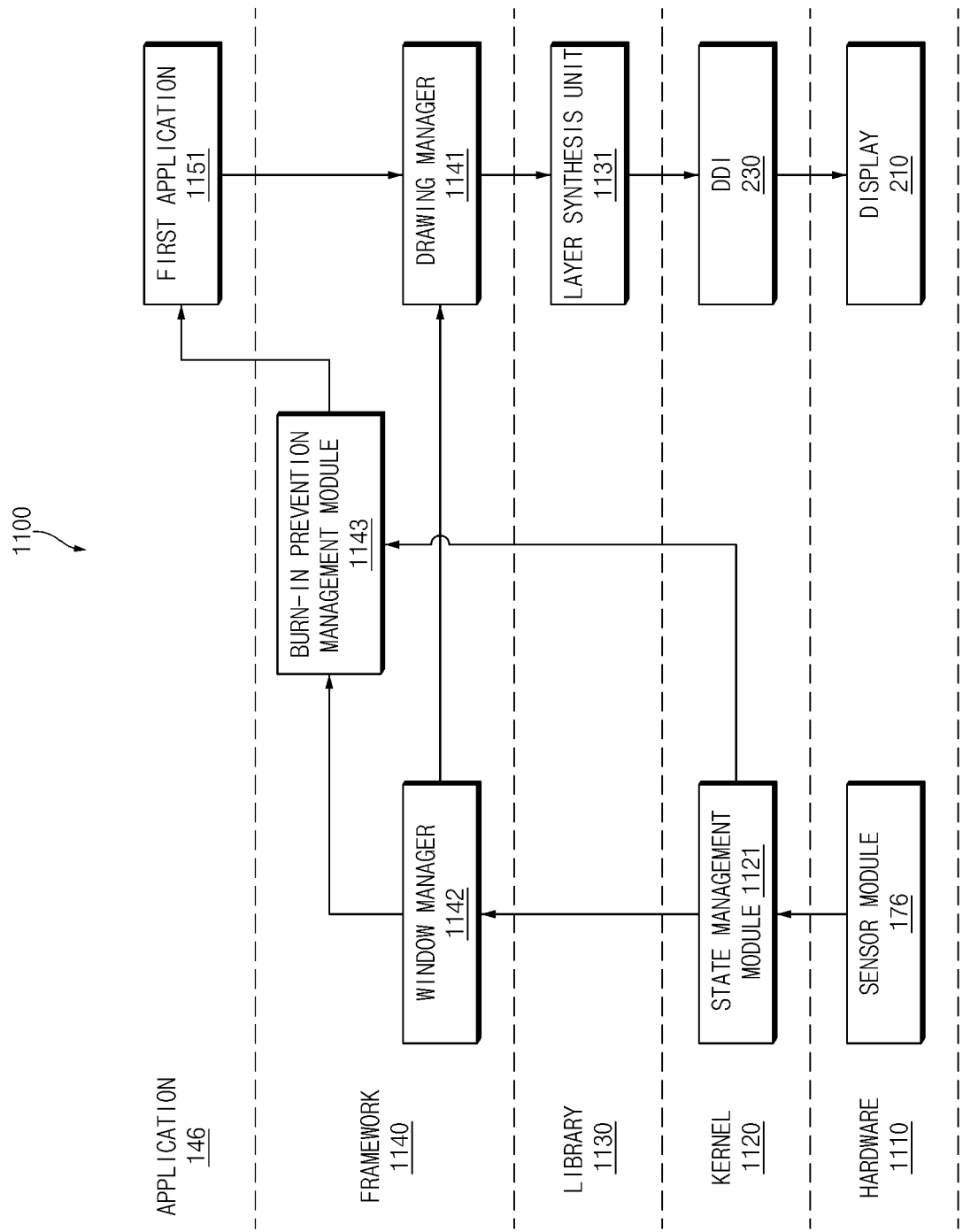
FIG. 11 is a block diagram illustrating components for reducing degradation of a display of an electronic device according to various embodiments.

FIG. 11 is a block diagram 1100 illustrating components for reducing degradation of the display 210 of an electronic device (e.g., the electronic device 101 of FIG. 1) according to various embodiments. The electronic device 101 according to the embodiment may include hardware 1110, a kernel 1120, a library 1130, a framework 1140, and an application 146.

In an embodiment, the hardware 1110 may include a sensor module (e.g., the sensor module 176 of FIG. 1) and the display 210. In an embodiment, the electronic device 101 may identify a state change of the electronic device 101 based on the sensor module 176. In an embodiment, the electronic device 101 may display, on the display 210, an AOD screen obtained by reorganizing content.

In an embodiment, the kernel 1120 may include a state management module 1121 and a DDI 230. In an embodiment, the state management module 1121 may identify a state change of the electronic device 101 based on the sensor module 176. In an embodiment, the electronic device 101 may display a screen on the display 210 using the DDI 230.

In an embodiment, when a state change of the electronic device 101 is identified through the sensor module 176, the state management module 1121 may activate at least part of a display area of the display 210. For example, the state management module 1121 may activate at least part of the display area of the display 210 by transmitting an activation signal to the DDI 230.

In an embodiment, the state management module 1121 may activate at least part of the display area of the display 210, based on a change of the state of the electronic device 101 and/or a change of the folding angle. For example, when the electronic device 101 is changed from a folded state to a flat state or the size of the folding angle is increased, the state management module 1121 may activate a display area (e.g., a first display area) of the display 210 that corresponds to the flat state. In another example, when the electronic device 101 is changed from a flat state to a folded state or the size of the folding angle is decreased, the state management module 1121 may activate a display area (e.g., a second display area) of the display 210 that corresponds to the folded state. The state management module 1121 may manage a folded state of the display 210 such as in-folding and/or out-folding.

In an embodiment, the state management module 1121 may calculate the folding angle of the display 210 based on sensing data received from the sensor module 176. The state management module 1121 may transfer the calculated folding angle of the display 210 to a window manager 1142 and/or a burn-in prevention/reduction management module 1143 (as used herein, the terms "prevent" or "prevention" may refer to preventing and/or reducing). In a general operating state, the state management module 1121 may transfer the folding angle of the display 210 to the burn-in prevention module 1143 through the window manager 1142. To minimize and/or reduce current consumption or adjust an AOD in a sleep state, the state management module 1121 may directly transfer the folding angle of the display 210 to the burn-in prevention module 1143 except through the window manager 1142.

In an embodiment, the library 1130 may include a layer synthesis unit 1131. The layer synthesis unit 1131 may synthesize a plurality of layers including content to be displayed on the display 210. For example, the layer synthesis unit 1131 may be a surface flinger. The layer synthesis unit 1131 may provide, to the DDI 230, data representing the plurality of layers synthesized.

In an embodiment, the framework 1140 may include a drawing manager 1141, the window manager 1142, and the burn-in prevention management module 1143. The burn-in prevention management module 1143 may be included in a processor (e.g., the processor 120 of FIG. 1). The burn-in prevention management module 1143 may be included in the window manager 1142.

In an embodiment, the drawing manager 1141 may draw at least one layer based on the resolution of the display area of the display 210. The drawing manager 1141 may be a program such as View™. The drawing manager 1141 may draw a screen by the application 146, based on the resolution of the second display area of the display 210.

In an embodiment, when a state change of the electronic device 101 is identified through the state management module 1121, the window manager 1142 may transfer information about a display area corresponding to a changed state of the electronic device 101 to the burn-in prevention management module 1143. For example, when a change of a folded state of the electronic device 101 is identified, the window manager 1142 may transfer information about a display area corresponding to a changed folded state of the electronic device 101 to the burn-in prevention management module 1143.

In an embodiment, the burn-in prevention management module 1143 may receive, through the state management module 1121 and/or the window manager 1142, information that a folded state of the electronic device 101 is changed. In a general operating state, the burn-in prevention management module 1143 may receive, from the window manager 1142, information that a folded state of the electronic device 101 is changed. To minimize and/or reduce current consumption or adjust an AOD in a sleep state, the burn-in prevention management module 1143 may receive, from the state management module 1121, information that a folded state of the electronic device 101 is changed. Based on the folding angle of the electronic device 101, the burn-in prevention management module 1143 may reorganize the content of the AOD screen to reduce a degree of degradation and/or burn-in of the display 210. For example, based on the folding angle of the display 210, the burn-in prevention management module 1143 may reorganize an AOD screen related to a first application 1151 running to display an AOD screen. The burn-in prevention management module 1143 may inform the running first application 1151 of a change of the folding angle of the display 210 to reorganize the AOD screen. The burn-in prevention management module 1143 may change display characteristics of the display 210 based on the folding angle, may analyze a physical property of the display 210, and may determine whether a degree of burn-in of the display 210 is less than or equal to a threshold value.

In an embodiment, the application 146 may include the running first application 1151. The first application 1151 may draw at least one layer based on the resolution of the display area of the display 210. The screen of the first application 1151 may be a screen for displaying the AOD screen. At least one layer may be an AOD screen executed in the first application 1151. For example, the first application 1151 may draw at least one layer corresponding to the resolution of the display area of the display 210 using the drawing manager 1141 such as View™. Accordingly, the first application 1151 may draw the AOD screen.

Figure 12:
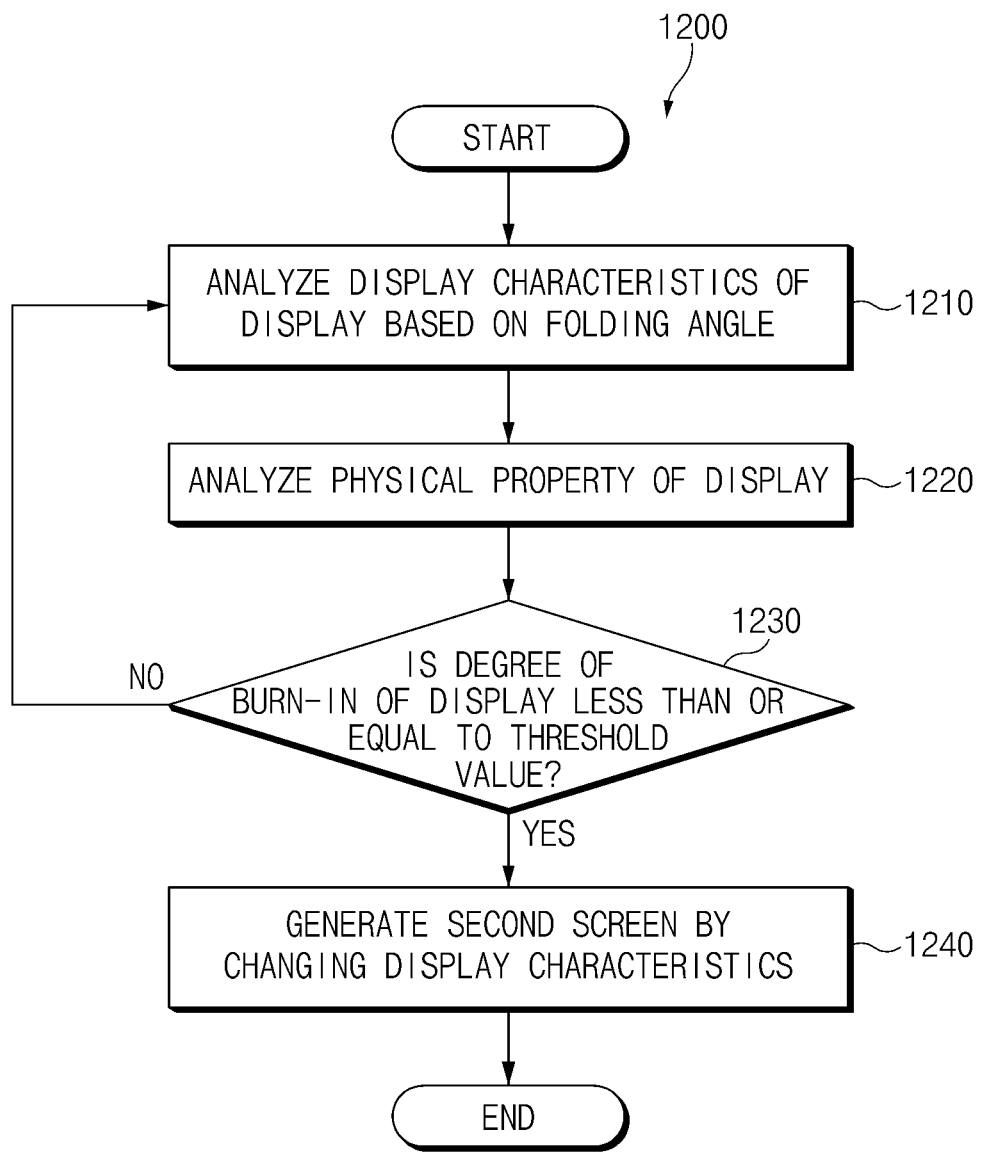
FIG. 12 is a flowchart illustrating an example method for generating a second screen based on a folding angle of a display of an electronic device according to various embodiments.

FIG. 12 is a flowchart 1200 illustrating an example method for generating a second screen based on a folding angle of a display (e.g., the display 210 of FIG. 2) of an electronic device (e.g., the electronic device 101 of FIG. 1) according to various embodiments.

In operation 1210, a processor (e.g., the processor 120 of FIG. 1) and/or a burn-in prevention management module (e.g., the burn-in prevention management module 1143 of FIG. 11) of the electronic device 101 according to the embodiment may analyze display characteristics of the display 210 based on the folding angle. The processor 120 and/or the burn-in prevention management module 1143 may analyze display characteristics or display properties of the display 210, such as brightness and font, based on the folding angle of the electronic device 101. Operation 1210 may be included in operation 40 of generating the second screen by reorganizing the first screen.

In operation 1220, the processor 120 and/or the burn-in prevention management module 1143 of the electronic device 101 according to the embodiment may analyze a physical property of the display 210. The processor 120 and/or the burn-in prevention management module 1143 may analyze and/or predict a physical property such as hardware physical property information of the display 210 for suppression of degradation and/or burn-in of the display 210. Operation 1220 may be included in operation 40 of generating the second screen by reorganizing the first screen.

In operation 1230, the processor 120 and/or the burn-in prevention management module 1143 of the electronic device 101 according to the embodiment may determine whether a degree of burn-in of the display 210 is less than or equal to a threshold value. The processor 120 and/or the burn-in prevention management module 1143 may predict a degree of burn-in due to an AOD screen displayed on the display 210 depending on display characteristics of the AOD screen. The processor 120 and/or the burn-in prevention management module 1143 may predict burn-in pass or burn-in fail depending on the predicted degree of burn-in. The burn-in pass may be a test result when the degree of burn-in predicted to be caused by the AOD screen displayed on the display 210 is less than or equal to the specified threshold value. The burn-in fail may be a test result when the degree of burn-in predicted to be caused by the AOD screen displayed on the display 210 exceeds the specified threshold value. When the degree of burn-in of the display 210 is less than or equal to the threshold value (operation 1230—YES), the processor 120 and/or the burn-in prevention management module 1143 may determine the burn-in pass and may proceed to operation 1240. When the degree of burn-in of the display 210 exceeds the threshold value (operation 1230—NO), the processor 120 and/or the burn-in prevention management module 1143 may determine the burn-in fail and may return to operation 1210. Operation 1230 may be included in operation 40 of generating the second screen by reorganizing the first screen.

In operation 1240, the processor 120 and/or the burn-in prevention management module 1143 of the electronic device 101 according to the embodiment may generate the second screen by changing the display characteristics. When determining to generate the second screen that causes a degree of burn-in less than or equal to the threshold value, the processor 120 and/or the burn-in prevention management module 1143 may generate the second screen by changing the display characteristics in response to the burn-in pass test result. For example, the processor 120 may generate the second screen by reducing the size of content on the first screen at a predetermined ratio. In another example, the processor 120 may generate the second screen by hiding at least a part of a plurality of content items such as a clock, a battery, a date, and notification displayed on the first screen. In another example, the processor 120 may generate the second screen by dividing and relocating content displayed on the first screen. Operation 1240 may be included in operation 40 of generating the second screen by reorganizing the first screen.

Figure 13:
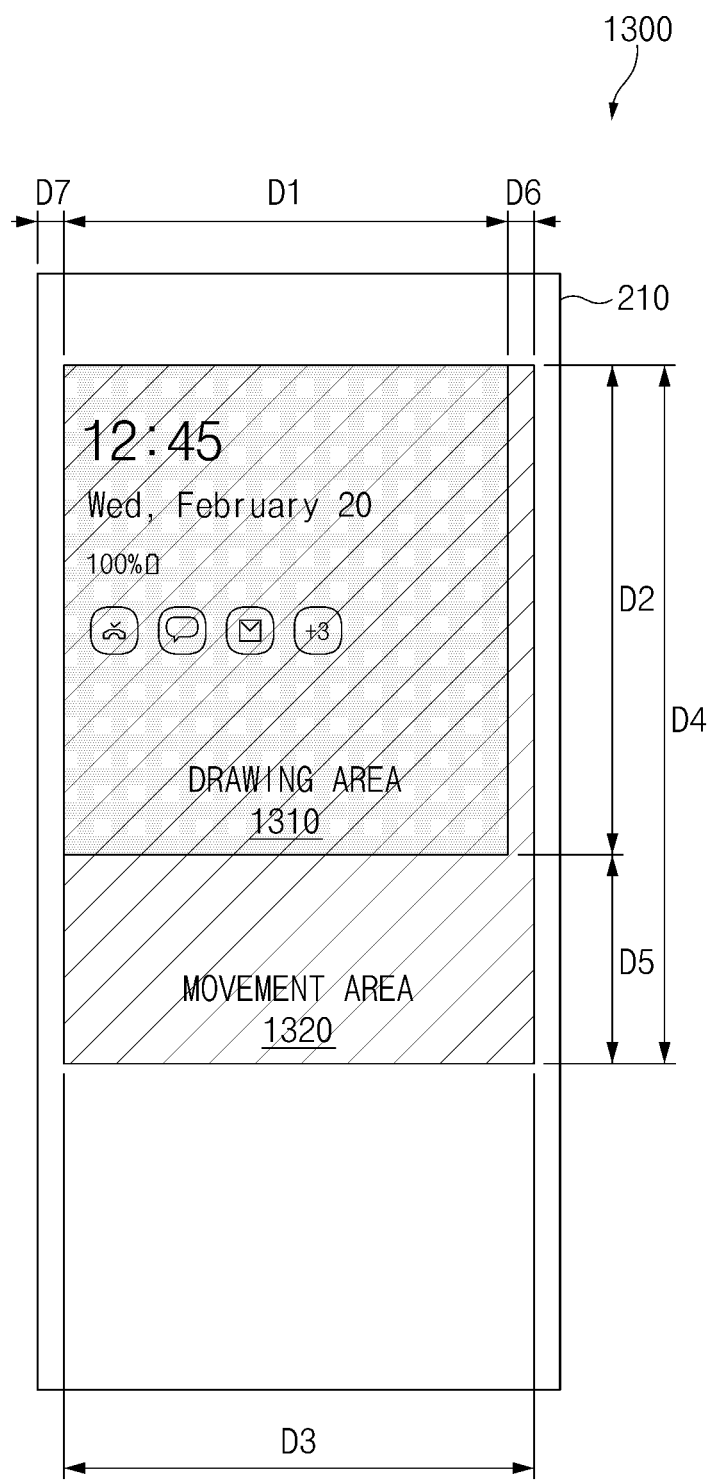
FIG. 13 is a diagram illustrating a drawing area and a movement area of a display of an electronic device according to various embodiments.

FIG. 13 is a diagram 1300 illustrating a drawing area 1310 and a movement area 1320 of the display 210 of an electronic device (e.g., the electronic device 101 of FIG. 1) according to various embodiments.

In an embodiment, the drawing area 1310 may be an area where the display 210 displays content included in an AOD screen when displaying the AOD screen. The drawing area 1310 may have a first length D1 in a first direction (e.g., the horizontal direction or the X-axis direction). The first length D1 may be not less than about 250 dot point (dp) and not more than about 300 dp. The drawing area 1310 may have a second length D2 in a second direction (e.g., the vertical direction or the Y-axis direction). The second length D2 may be not less than about 300 dp and not more than about 350 dp.

In an embodiment, the movement area 1320 may be an area in which the display 210 is able to move the content included in the AOD screen when displaying the AOD screen. The movement area 1320 may have a third length D3 in the first direction. The third length D3 may be not less than about 300 dp and not more than about 320 dp. The movement area 1320 may have a fourth length D4 in the second direction. The fourth length D4 may be not less than about 400 dp and not more than about 500 dp.

In an embodiment, the movement area 1320 may include the drawing area 1310. The area of the movement area 1320 may be greater than the area of the drawing area 1310. The movement area 1320 may be longer than the drawing area 1310 in the second direction by a fifth length D5. The movement area 1320 may be longer than the drawing area 1310 in the first direction by a sixth length D6.

In an embodiment, the movement area 1320 may be set as a partial area of the display 210. The movement area 1320 may be an area spaced apart inward from an edge of the display 210 in the first direction by a seventh length D7. The seventh length D7 may be not less than about 20 dp and not more than about 30 dp.

In an embodiment, the drawing area 1310 may periodically or aperiodically move within the movement area 1320 by a specified distance. Degradation and/or burn-in of the display 210 may be reduced by moving the drawing area 1310 within the movement area 1320.

In an embodiment, a processor (e.g., the processor 120 of FIG. 1) of the electronic device 101 may be configured to change display characteristics of the display 210 based on a folding angle. For example, the processor 120 may variably set the drawing area 1310 and the movement area 1320 depending on the folding angle and the structure of the display 210 in a foldable form-factor form when the display 210 displays the AOD screen. The processor 120 may change display characteristics of the AOD screen depending on characteristics of the display 210 that variably change to reduce degradation and/or burn-in of the display 210. The display characteristics of the AOD screen may include the brightness of content of the AOD screen, the text font of the content of the AOD screen, the size of the content of the AOD screen, and the position information of the content of the AOD screen. For example, in the case of displaying a second screen by changing the text font of the content of the AOD screen, which is a first screen, from a Gothic font or a boldface font to a thin font, degradation and/or burn-in of the display 210 may be reduced, as compared with when text such as a Gothic font or a boldface font is displayed.

Figure 14:
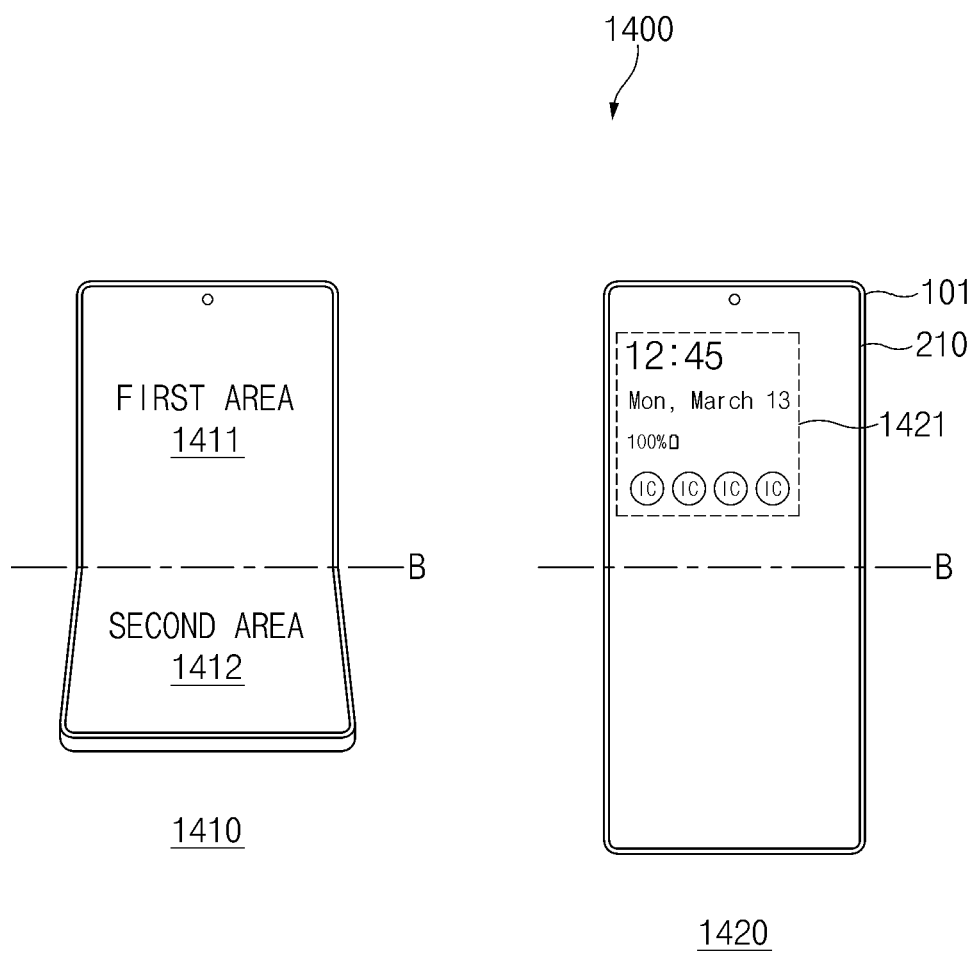
FIG. 14 is a diagram illustrating a half fold mode of an electronic device according to various embodiments.

FIG. 14 is a diagram 1400 illustrating a half fold mode 1410 and 1420 of the electronic device 101 according to various embodiments.

In an embodiment, the electronic device 101 may be folded in half about a folding axis B in the half fold mode 1410 and 1420. The half fold mode 1410 and 1420 may be a structure in which the display 210 is folded in half in an in-folding manner. In the half fold mode 1410 and 1420, the display 210 may be folded such that a first area 1411 and a second area 1412 face each other.

In an embodiment, the electronic device 101 may display an AOD screen 1421 on the first area 1411. Based on a folding angle, a processor (e.g., the processor 120 of FIG. 1) of the electronic device 101 may reorganize the AOD screen 1421 for reducing degradation and/or burn-in of the display 210. The processor 120 may newly organize a screen associated with an application 146 executing the AOD screen 1421, based on the folding angle of the display 210 and may display the screen on the display 210. For example, in the half fold mode 1410 and 1420, the processor 120 may move the AOD screen 1421 to the first area 1411 such that the AOD screen 1421 does not overlap the folding axis B.

Figure 15:
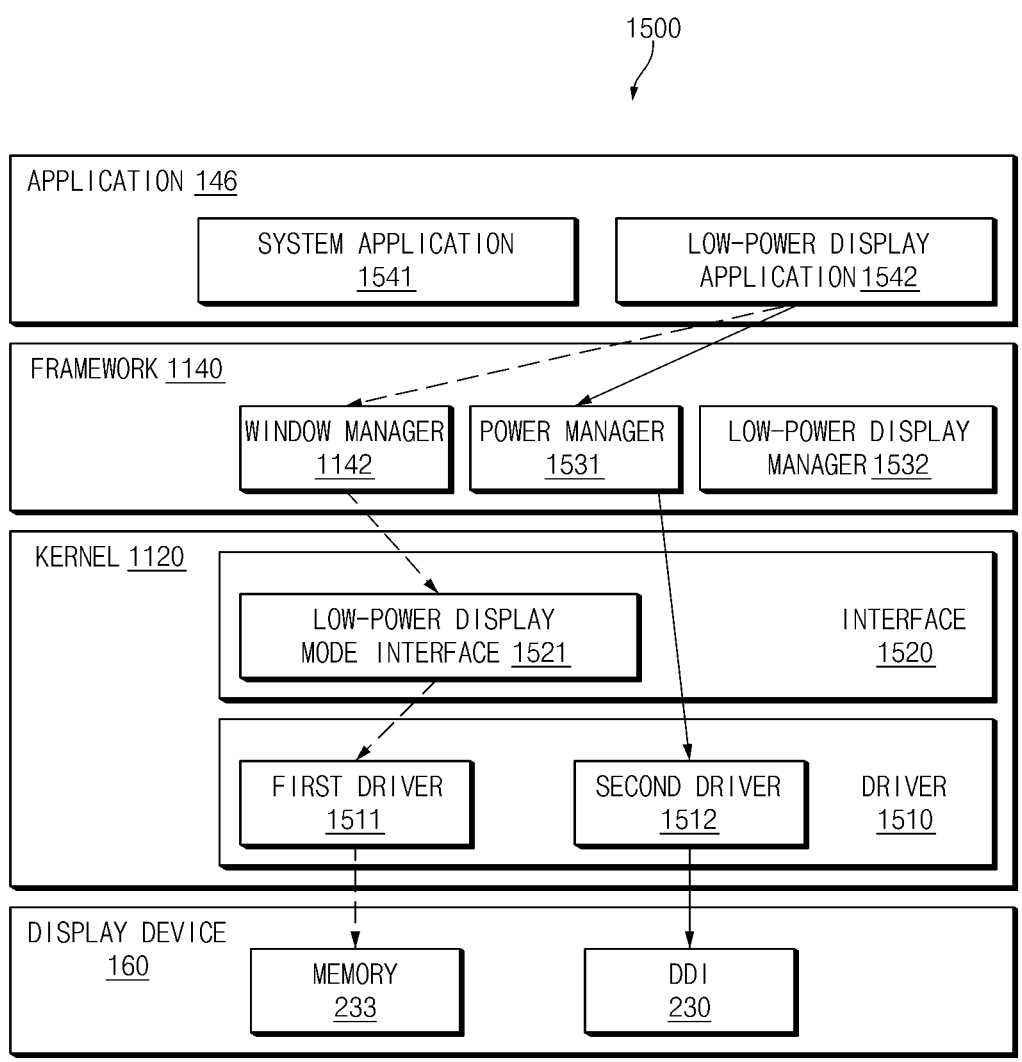
FIG. 15 is a block diagram illustrating components for controlling a display of an electronic device in a low-power display mode according to various embodiments.

FIG. 15 is a block diagram 1500 illustrating components for controlling a display (e.g., the display 210 of FIG. 2) of an electronic device (e.g., the electronic device 101 of FIG. 1) in a low-power display mode according to various embodiments. The electronic device 101 according to the embodiment may include a display device 160, a kernel 1120, a framework 1140, and applications 146.

In an embodiment, programs of the electronic device 101 may include an operating system (OS) that controls resources related to the electronic device 101, and/or the various applications 146 driven on the operating system. For example, the operating system may include Android™, iOS™, Windows™, Symbian™, Tizen™, or Bath™. At least some of the programs may be preloaded on the electronic device in the manufacture, or may be downloaded or updated from an external electronic device or a server in a use environment of a user.

In an embodiment, the applications 146 may include a system application 1541 and a low-power display application 1542. For example, the low-power display application 1542 may be an application that displays an AOD screen. When the operating mode of the display 210 of the electronic device 101 is switched to the low-power display mode, the low-power display application 1542 may generate content to be displayed through the display device 160 while the display 210 operates in the low-power display mode.

In an embodiment, when a notification event occurs while the electronic device 101 operates in the low-power display mode, the low-power display application 1542 may perform control to generate content corresponding to the notification event. For example, the low-power display application 1542 may control a DDI 230 to display the content on the display 210 based on the operating mode of the display 210 of the electronic device 101.

In an embodiment, the framework 1140 may provide various functions to the applications 146 such that the applications 146 use functions or information provided by one or more resources of the electronic device 101. For example, the framework 1140 may include a window manager 1142, a power manager 1531, and/or a low-power display manager 1532. The framework 1140 may dynamically remove some of the existing components, or may add new components.

In an embodiment, the window manager 1142 may manage a GUI resource that is used on a screen. For example, the window manager 1142 may generate a window corresponding to content to be displayed on the display 210, using display information generated through at least one view.

In an embodiment, the power manager 1531 may manage the capacity, temperature, and/or power of a battery (e.g., the battery 189 of FIG. 1) and may determine or provide power information required for operation of the electronic device 101 using information associated with the battery 189. The power manager 1531 may supply power corresponding to the operating mode or the power consumption level of the display 210 of the electronic device 101, based on control of the low-power display application 1542.

In an embodiment, the low-power display manager 1532 may provide state information of the electronic device 101 to the low-power display application 1542. The low-power display manager 1532 may control the brightness of the display 210 based on the power consumption level of the electronic device 101.

In an embodiment, the low-power display manager 1532 may learn and/or analyze physical properties of the display 210. The physical properties of the display 210 may have values specified when the display 210 is manufactured. The low-power display manager 1532 may generate initial learning data by learning physical characteristics of the display 210. The low-power display manager 1532 may update the learning data by consistently analyzing the physical properties that dynamically vary depending on the use of the display 210. The updated learning data may include the folding angle of the display 210, the size of the display 210, and hardware physical property information of the display 210. The low-power display manager 1532 may predict a result value for a degree of degradation and/or burn-in of the display 210 by analyzing the updated learning data. The low-power display manager 1532 may generate a predictive model for the degree of degradation and/or burn-in of the display 210.

In an embodiment, the kernel 1120 may control, allocate, and/or retrieve system resources of the electronic device 101. The kernel 1120 may include a driver 1510 and an interface 1520.

In an embodiment, the driver 1510 may drive at least one hardware device of the electronic device 101. The driver 1510 may include a first driver 1511 and a second driver 1512. For example, the first driver 1511 may be referred to as a general display driver, and the second driver 1512 may be referred to as a display control driver.

In an embodiment, the first driver 1511 may store, in a memory 233 of the display device 160, content data received through a low-power display mode interface 1521 included in the interface 1520. The first driver 1511 may determine the content data received through the low-power display mode interface 1521 to be content data for displaying the AOD screen during the low-power display mode.

In an embodiment, the second driver 1512 may control operation of the display 210 of the electronic device 101. The second driver 1512 may set the color, form, position, and/or size of the AOD screen displayed on the display 210, based on the operating mode of the display 210 of the electronic device 101.

In an embodiment, a processor (e.g., the processor 120 of FIG. 1) and/or the framework 1140 of the electronic device 101 may analyze physical properties of the display 210. The processor 120 and/or the framework 1140 may dynamically perform a degradation and/or burn-in test of the display 210. When the electronic device 101 operates in the low-power mode, the low-power display manager 1532 may provide state information of the electronic device 101 to the low-power display application 1542. The low-power display manager 1532 may control the brightness of the display 210 based on the power consumption level of the electronic device 101.

In an embodiment, the processor 120 and/or the framework 1140 may learn and/or analyze physical properties of the display 210. The physical properties of the display 210 may be hardware physical properties of the display 210, such as brightness and/or size. The processor 120 and/or the framework 1140 may newly set a predictive model, based on dynamically changing physical properties of the display 210. The processor 120 and/or the framework 1140 may reorganize the AOD screen depending on the set predictive model. Parameters of the display 210 for setting the predictive model may include brightness information of the display 210, the folding angle of the display 210, the size of the display 210, and hardware physical property information of the display 210.

Figure 16:
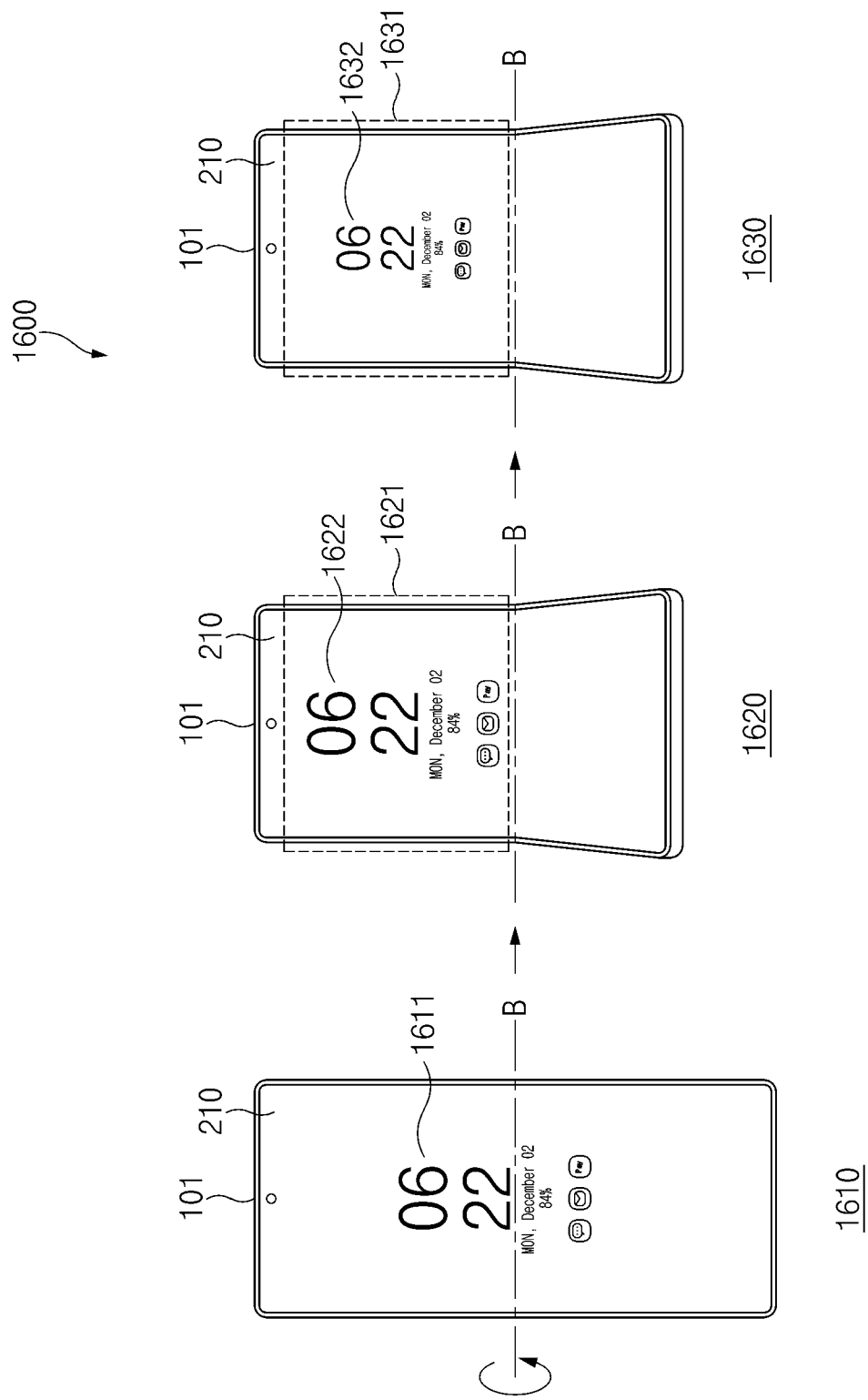
FIG. 16 is a diagram illustrating an operation of generating a second screen by reorganizing a first screen of a display of an electronic device according to various embodiments.

FIG. 16 is a diagram 1600 illustrating an example operation of generating a second screen 1622 by reorganizing a first screen 1611 of the display 210 of the electronic device 101 according to various embodiments.

In an embodiment, a processor (e.g., the processor 120 of FIG. 1) may display an AOD screen of the first screen 1611 on the display 210 when the display 210 is in a flat state 1610. The processor 120 may reorganize the first screen 1611 when the display 210 is changed from the flat state 1610 to an intermediate state 1620. The intermediate state 1620 may be a state between the flat state 1610 and a folded state. In the intermediate state 1620, the folding angle of the display 210 may be more than 0 degrees and less than 180 degrees. The processor 120 may generate the second screen 1622 by reorganizing the first screen 1611.

In an embodiment, when generating the second screen 1622 by reorganizing the first screen 1611, the processor 120 may move a drawing area (e.g., the drawing area 1310 of FIG. 13) displaying content of the AOD screen within a movement area 1621 on which the content is able to be displayed. When the display 210 is in the intermediate state 1620, the movement area 1621 may be one of two areas divided from each other by a folding axis B. The processor 120 may move the second screen 1622 within the movement area 1621.

In an embodiment, the processor 120 may predict a result value for a degree of degradation and/or burn-in due to the AOD screen displayed on the display 210. The processor 120 may predict the result value for the degree of degradation and/or burn-in due to the AOD screen, based on learning and/or analysis. Based on the predicted result value, the processor 120 may determine a degradation and/or burn-in test result of the display 210 to be pass or fail.

In an embodiment, the processor 120 may determine whether the degree of burn-in of the display 210 due to the second screen 1622 is less than or equal to a threshold value. The processor 120 may calculate a result value by predicting whether the degree of burn-in of the display 210 due to the second screen 1622 is less than or equal to the threshold value. When the result value is less than or equal to the threshold value, the processor 120 may determine the degradation and/or burn-in test result to be pass and may display the second screen 1622 on the screen. When the result value exceeds the threshold value, the processor 120 may determine the degradation and/or burn-in test result to be fail and may perform again an operation of changing display properties.

In an embodiment, when determining the degradation and/or burn-in test result to be fail, the processor 120 may proceed to an additional correction state 1630. The processor 120 may generate a third screen 1632 by additionally changing the second screen 1622 in the additional correction state 1630. For example, when the degradation and/or burn-in test result is fail, the processor 120 may generate the third screen 1632 by decreasing the size of text of the second screen 1622 and may display the third screen 1632 in a movement area 1631 of the display 210.

Figure 17:
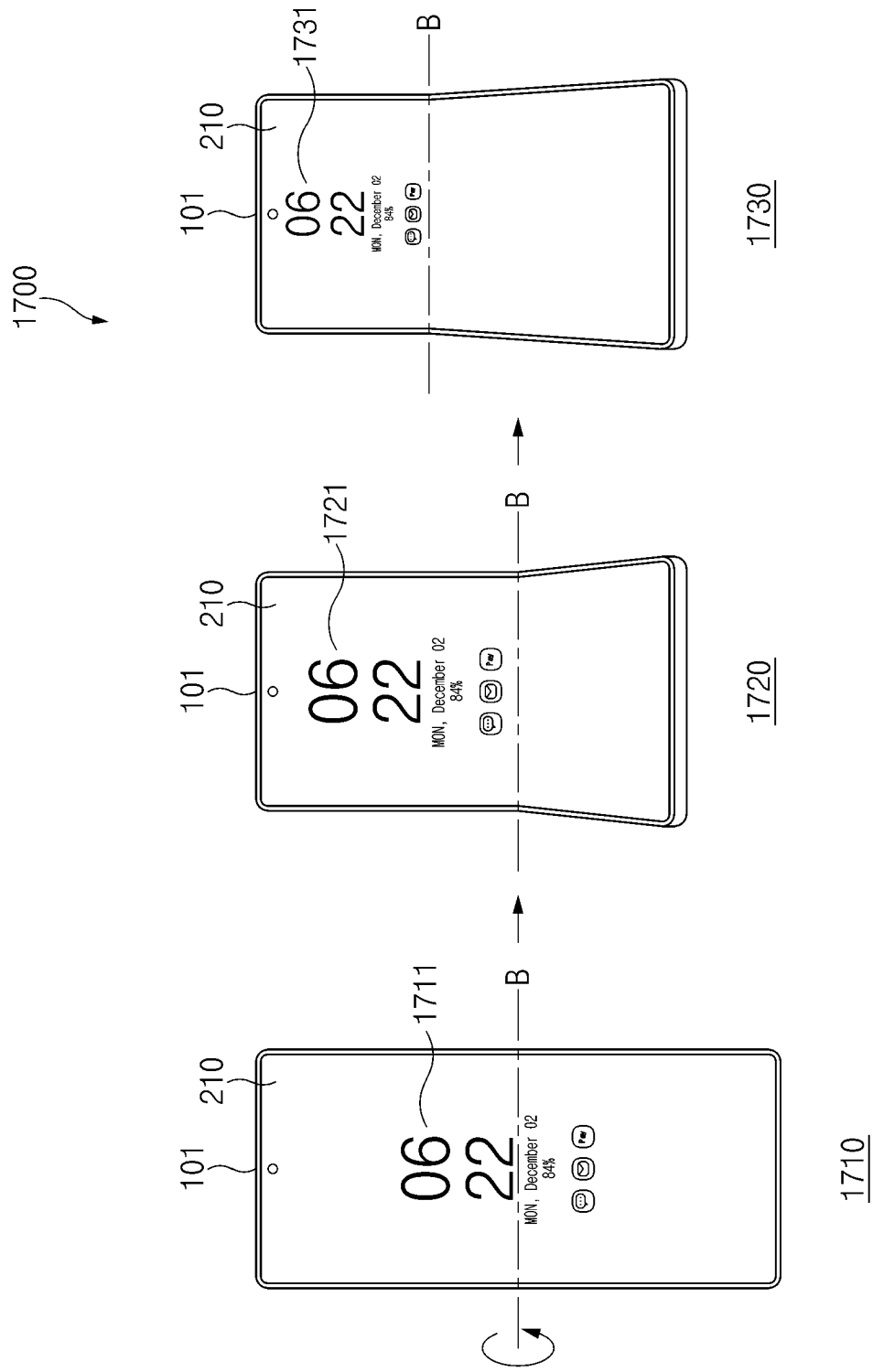
FIG. 17 is a diagram illustrating an example operation of generating a second screen by reorganizing a first screen of a display of an electronic device according to various embodiments.

FIG. 17 is a diagram 1700 illustrating an example operation of generating a second screen by reorganizing a first screen of the display 210 of the electronic device 101 according to various embodiments.

In an embodiment, a processor (e.g., the processor 120 of FIG. 1) may display an AOD screen of the first screen 1711 on the display 210 when the display 210 is in a flat state 1710. The processor 120 may reorganize the first screen 1711 when the display 210 starts to be folded about a folding axis B and is changed from the flat state 1710 to a first intermediate state 1720. The processor 120 may generate the second screen 1721 by reorganizing the first screen 1711. The processor 120 may reorganize the second screen 1721 when the display 210 continues to be folded about the folding axis B and is changed from the first intermediate state 1720 to a second intermediate state 1730. The processor 120 may generate a third screen 1731 by reorganizing the second screen 1721.

In an embodiment, when changing the electronic device 101 from the flat state 1710 to the intermediate state 1720 or 1730, the processor 120 may move the AOD screen such that the AOD screen does not overlap the folding axis B of the display 210. When the display 210 is in the intermediate state 1720 or 1730, the processor 120 may display the AOD screen such that the AOD screen does not overlap the folding axis B.

In an embodiment, the processor 120 may reorganize the AOD screen, based on a folded state of the display 210. For example, the electronic device 101 may have various form-factor structures such as a half folding structure in which the display 210 is folded in half and a Z-flip folding structure in which the display 210 is folded in three and is folded at a point about one-third of the display 210. The AOD screen may be displayed on the display 210 of the electronic device 101 having the various form-factor structures. The processor 120 may reduce degradation and/or burn-in of the display 210 by dynamically changing property information of the AOD screen depending on the area where the AOD screen is displayed.

Figure 18:
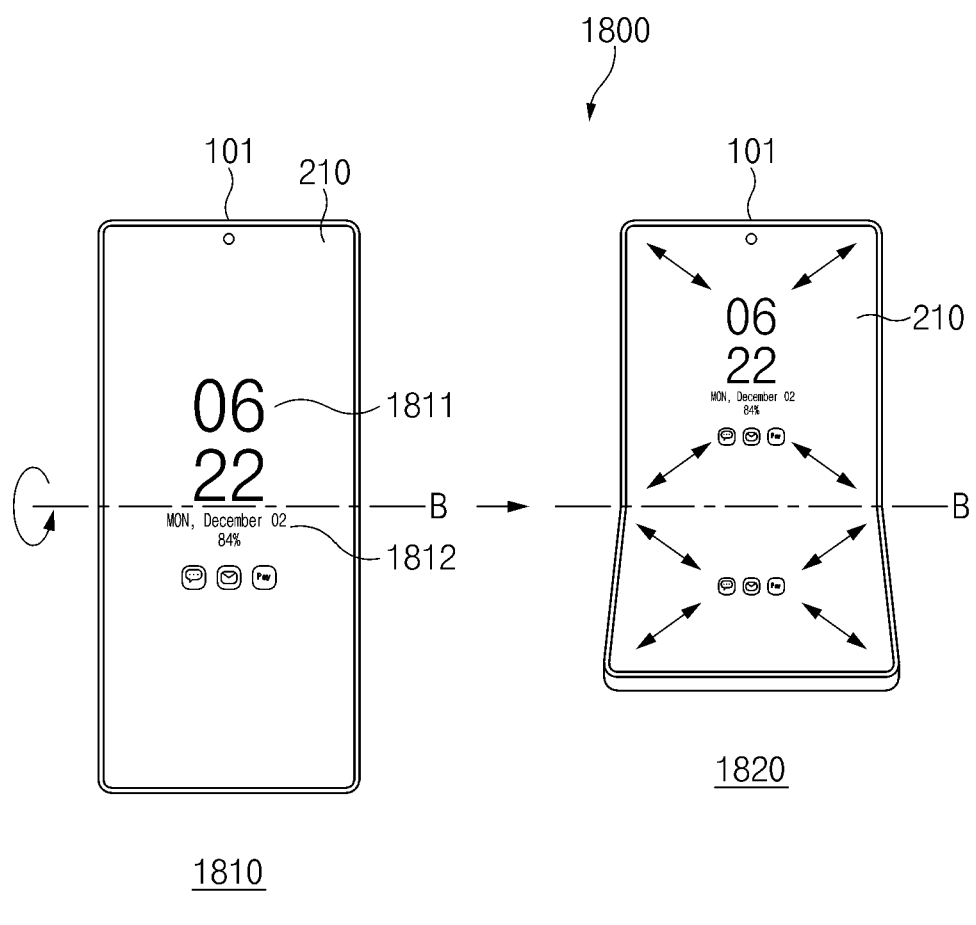
FIG. 18 is a diagram illustrating an example operation of generating a second screen by reorganizing a first screen of a display of an electronic device according to various embodiments.

FIG. 18 is a diagram 1800 illustrating an example operation of generating a second screen by reorganizing a first screen of the display 210 of the electronic device 101 according to various embodiments.

In an embodiment, when the display 210 is in a flat state 1810, a processor (e.g., the processor 120 of FIG. 1) may display, on the display 210, the first screen that is an AOD screen including first content 1811 and second content 1812. When the display 210 starts to be folded about a folding axis B and is changed from the flat state 1810 to an intermediate state 1820, the processor 120 may generate the second screen by reorganizing the first screen.

In an embodiment, when the display 210 is changed to the intermediate state 1820, the processor 120 may generate the second screen by dividing the first content 1811 and the second content 1812 from each other with respect to the folding axis B. For example, the processor 120 may display, on an area above the folding axis B, the first content 1811 having a view form that is intended to be viewed by a user and may display, on an area below the folding axis B, the second content 1812 having an icon form to which the user is able to input a touch.

In an embodiment, to prevent burn-in, the processor 120 may divide at least some content displayed by an application (e.g., the application 146 of FIG. 1) depending on a folding angle. For example, when a notification application is displayed as the AOD screen, the processor 120 may display a clock on an upper area of the display 210 with respect to the folding axis B and may display an icon on a lower area of the display 210. To reduce degradation and/or burn-in due to the first content 1811 and the second content 1812, the processor 120 may change display properties of the first content 1811 and the second content 1812. For example, the processor 120 may independently move the first content 1811 and the second content 1812 every specified period.

Figure 19:
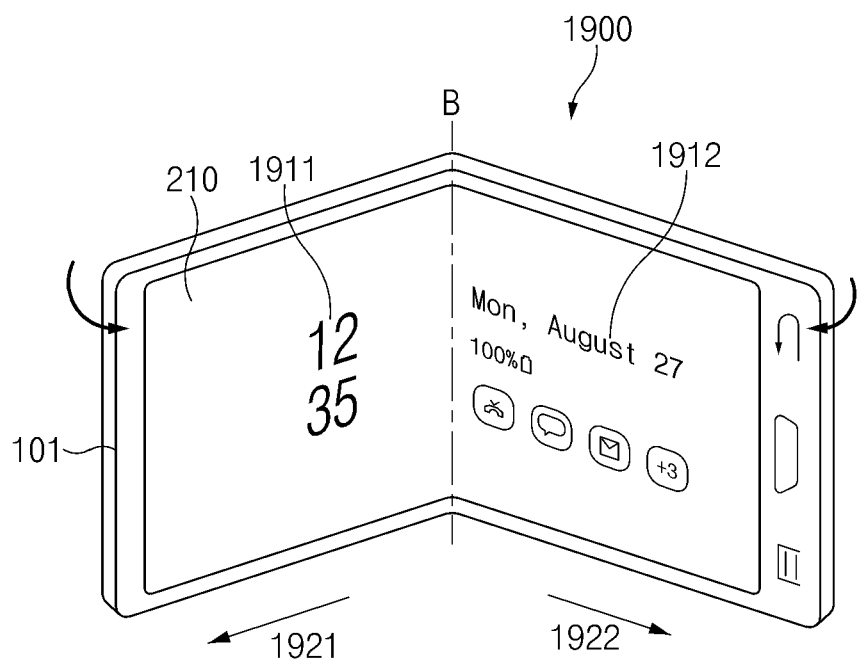
FIG. 19 is a perspective view illustrating an example operation of generating a second screen by reorganizing a first screen of a display of an electronic device according to various embodiments.

FIG. 19 is a perspective view 1900 illustrating an example operation of generating a second screen by reorganizing a first screen of the display 210 of the electronic device 101 according to various embodiments.

In an embodiment, a processor (e.g., the processor 120 of FIG. 1) may reorganize the first screen depending on an arrangement direction and/or a folded form of the electronic device 101. The processor 120 may generate the second screen in consideration of the form in which the display 210 is viewed depending on the arrangement direction of the electronic device 101. When the electronic device 101 is folded about a folding axis B, the processor 120 may generate the second screen based on a first direction 1921 and a second direction 1922 in which the display 210 faces.

In an embodiment, when the electronic device 101 is oriented in the landscape orientation, the processor 120 may display an AOD screen in which the position of content is reorganized to reduce degradation and/or burn-in of the display 210. For example, when the display 210 is viewed to be long in the landscape orientation and the folding axis B is formed in the portrait orientation, the processor 120 may display clock content in a first area 1911 on the left side and may display notification content in a second area 1912 on the right side. When the electronic device 101 is at least partially folded about the folding axis B, the processor 120 may set the positions, sizes, fonts, and/or brightness of the content items based on the first direction 1921 and the second direction 1922 in which the display 210 faces.

Figure 20:
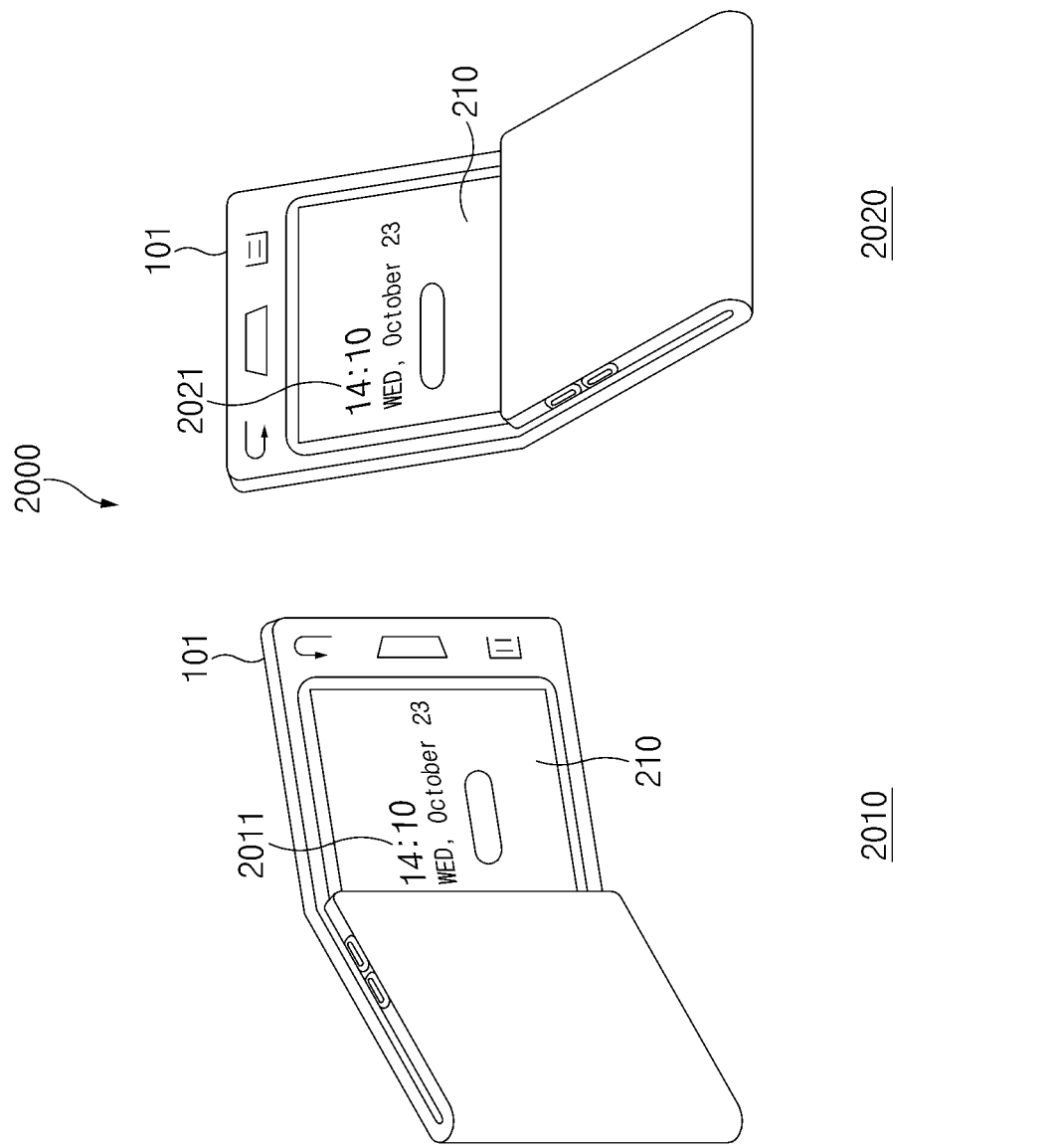
FIG. 20 is a perspective view illustrating an example operation of generating a second screen by reorganizing a first screen of a display of an electronic device according to various embodiments.

FIG. 20 is a perspective view 2000 illustrating an example operation of generating a second screen by reorganizing a first screen of the display 210 of the electronic device 101 according to various embodiments.

In an embodiment, a processor (e.g., the processor 120 of FIG. 1) may reorganize the first screen depending on the orientation of the electronic device 101 and/or the form in which the display 210 is viewed. The processor 120 may generate the second screen depending on the orientation of the electronic device 101 and/or the form in which the display 210 is viewed.

In an embodiment, when the electronic device 101 has a foldable form-facture structure that can be folded in three, the processor 120 may display an AOD screen on a one-third portion on which the display 210 is viewed. When the electronic device 101 is oriented in the landscape orientation as in a first case 2010, the processor 120 may display content of the AOD screen such that a user reads the content in the landscape orientation. When the electronic device 101 is oriented in the portrait orientation as in a second case 2020, the processor 120 may rotate the content of the AOD screen by 90 degrees, as compared with when the electronic device 101 is oriented in the landscape orientation as in the first case 2010.

Figure 21:
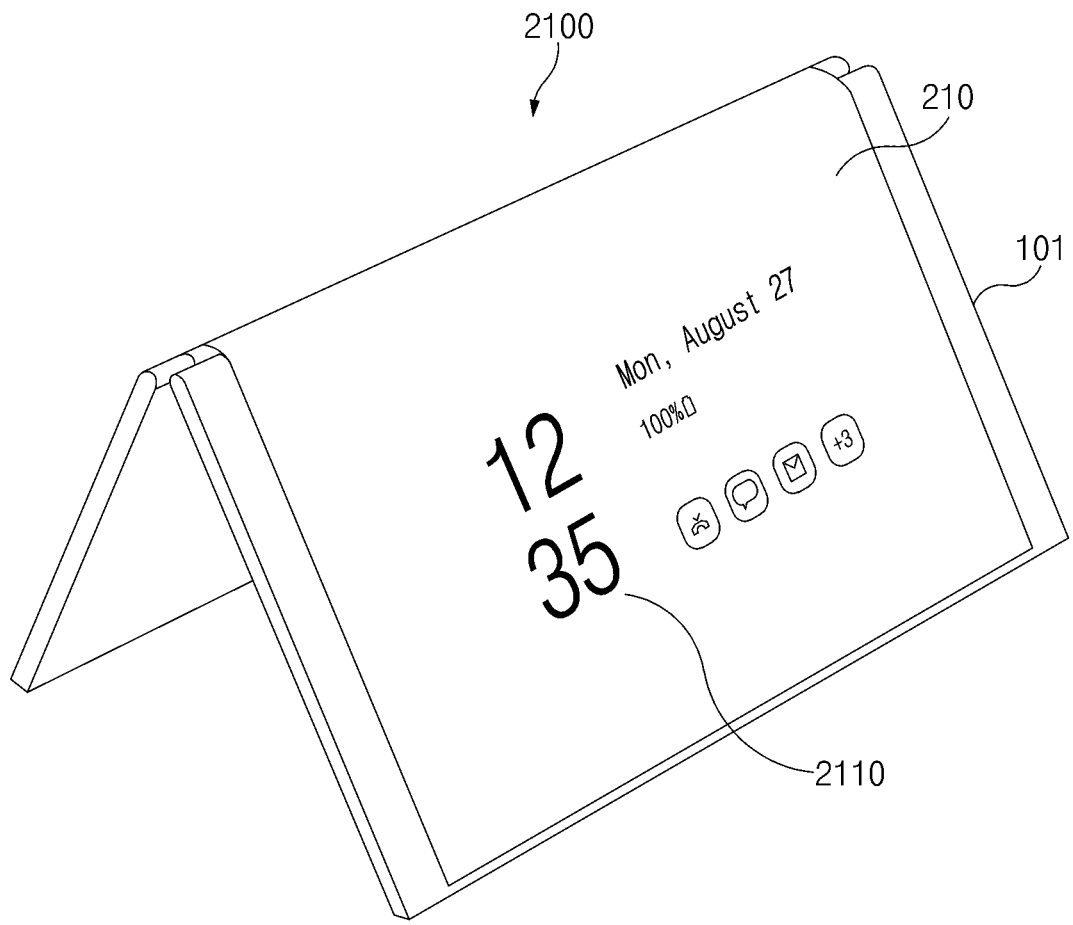
FIG. 21 is a perspective view illustrating an example operation of generating a second screen by reorganizing a first screen of a display of an electronic device according to various embodiments.

FIG. 21 is a perspective view 2100 illustrating an example operation of generating a second screen by reorganizing a first screen of the display 210 of the electronic device 101 according to various embodiments.

In an embodiment, a processor (e.g., the processor 120 of FIG. 1) may display an AOD screen 2110 on the electronic device 101 having a table foldable form-factor structure. For example, when the electronic device 101 is placed in the form of a table clock on a table, the processor 120 may display the AOD screen 2110 including a clock, a date, and/or notification in the form of a table clock.

In an embodiment, the processor 120 may display the AOD screen 2110 to correspond to the form of the electronic device 101. For example, when the electronic device 101 has a slide type structure, the processor 120 may display the AOD screen 2110 on a portion viewed by a user. In another example, when an external cover is coupled to the electronic device 101, the processor 120 may display the AOD screen 2110 on a portion viewed by the user. When the form of the electronic device 101 is changed, the processor 120 may reorganize the AOD screen 2110 and may display a new AOD screen on the display 210.

Figure 22:
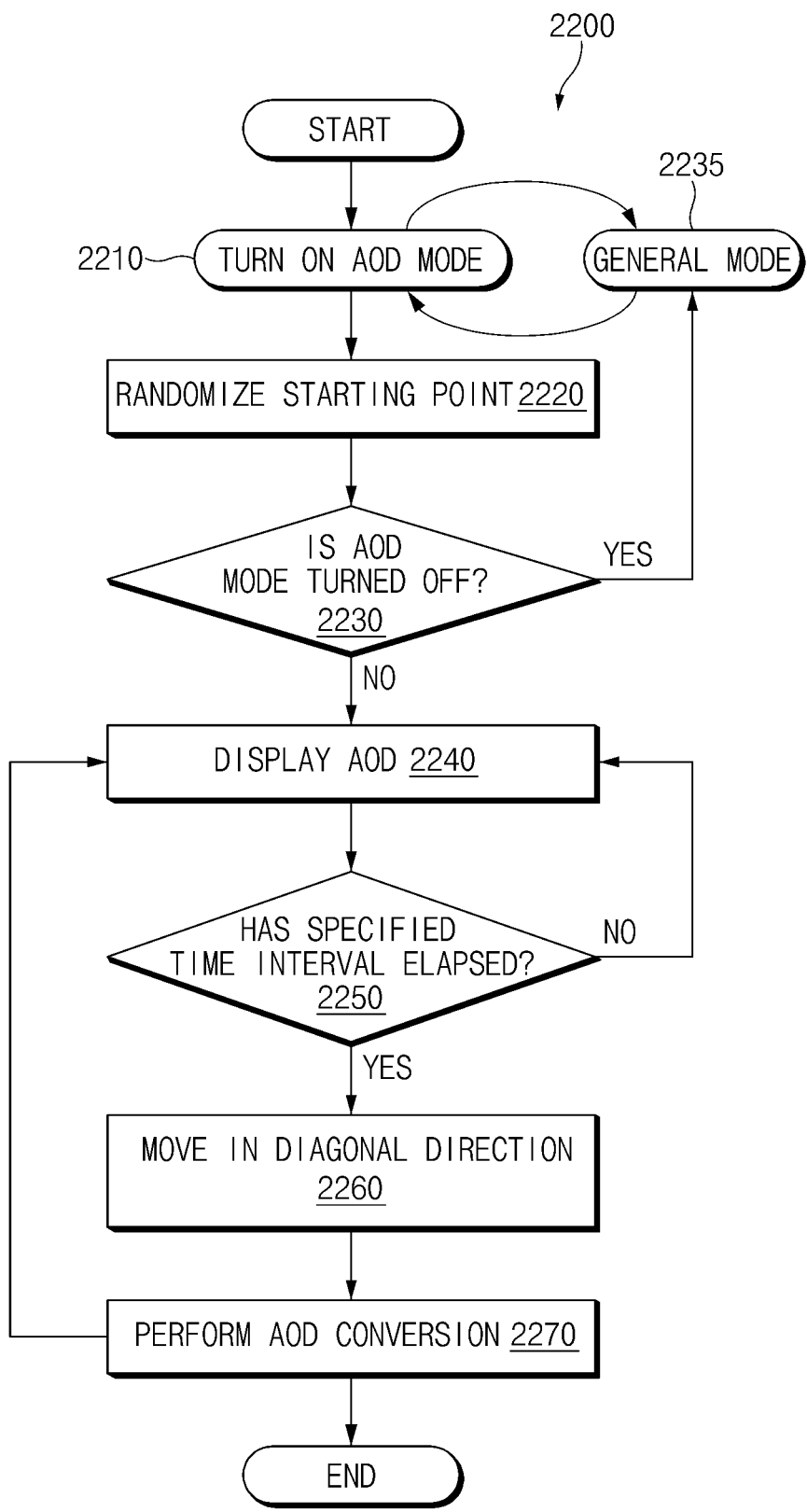
FIG. 22 is a flowchart illustrating an example method for displaying an AOD screen of a display of an electronic device according to various embodiments.

FIG. 22 is a flowchart 2200 illustrating an example method for displaying an AOD screen of a display (e.g., the display 210 of FIG. 2) of an electronic device (e.g., the electronic device 101 of FIG. 1) according to various embodiments.

In operation 2210, a processor (e.g., the processor 120 of FIG. 1) of the electronic device 101 according to the embodiment may turn on an AOD mode. In an inactive mode or a sleep mode (e.g., a low-power mode), the processor 120 may turn on the AOD mode (e.g., a low-power display mode) of the display 210. The processor 120 may display the AOD screen on the display 210 by turning on the AOD mode. When the electronic device 101 receives a user input, the processor 120 may switch the electronic device 101 from the AOD mode to a general mode.

In operation 2220, the processor 120 of the electronic device 101 according to the embodiment may randomize a starting point. The starting point may be a point at a specified position in the area displaying content of the AOD screen at the time when the AOD mode is turned on. For example, the starting point may be located at the upper left end of the area displaying the content of the AOD screen at the time when the AOD mode is turned on. The processor 120 may randomly set the position of the starting point.

In operation 2230, the processor 120 of the electronic device 101 according to the embodiment may determine whether the AOD mode is turned off. When the AOD mode is turned off (operation 2230—YES), the processor 120 may proceed to operation 2235. When the AOD mode is maintained in the turned-on state (operation 2230—NO), the processor 120 may proceed to operation 2240.

In operation 2235, the processor 120 of the electronic device 101 according to the embodiment may be switched to the general mode. In the general mode, the processor 120 may turn on the display 210 and may display an execution screen of an application (e.g., the application 146 of FIG. 1). When a specified period of time elapses in the state in which there is no user input to the electronic device 101, the processor 120 may switch the electronic device 101 from the general mode to the AOD mode.

In operation 2240, the processor 120 of the electronic device 101 according to the embodiment may display an AOD screen. The processor 120 may display the AOD screen on the display 210. The processor 120 may determine the luminance of the AOD screen and may display the AOD screen with the determined luminance.

In operation 2250, the processor 120 of the electronic device 101 according to the embodiment may determine whether a specified time interval has elapsed. The specified time interval may be a time interval for maintaining a degree of degradation and/or burn-in of the display 210 due to the AOD screen at a threshold value or less. For example, in the case of displaying a clock on the AOD screen, the processor 120 may determine whether one minute has elapsed after the AOD screen was displayed. The processor 120 may maintain operation 2240 until the specified time interval elapses (operation 2250—NO). The processor 120 may proceed to operation 2260 when the specified time interval elapses (operation 2250—YES).

In operation 2260, the processor 120 of the electronic device 101 according to the embodiment may move in a diagonal direction. The processor 120 may move the AOD screen in the diagonal direction. For example, in the case of displaying a clock on the AOD screen, the processor 120 may move the AOD screen in the diagonal direction by a specified distance every time one minute elapses. The specified distance may be substantially the same as the length and/or width of one pixel.

In operation 2270, the processor 120 of the electronic device 101 according to the embodiment may perform AOD conversion. The processor 120 may repeat operation 2240 by displaying the AOD screen at the position separated from the previous position in the diagonal direction by the specified distance.

Figure 23:
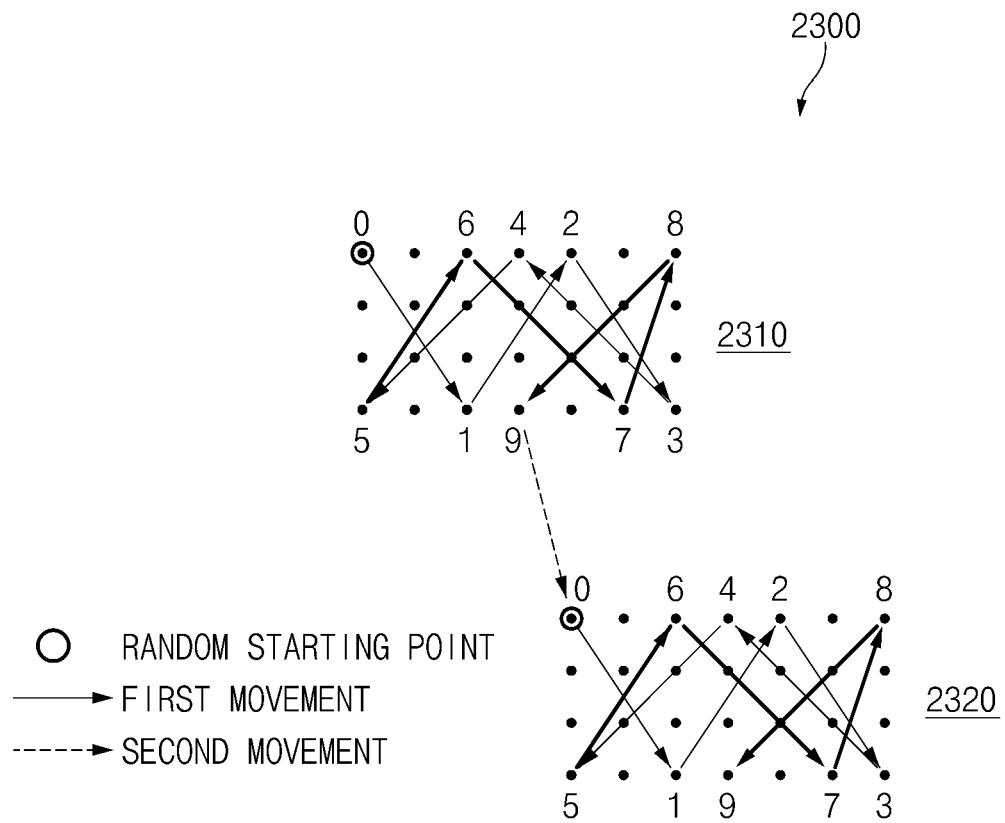
FIG. 23 is a diagram illustrating an example method for displaying an AOD screen of a display of an electronic device according to various embodiments.

FIG. 23 is a diagram 2300 illustrating an example method for displaying an AOD screen of a display (e.g., the display 210 of FIG. 2) of an electronic device (e.g., the electronic device 101 of FIG. 1) according to various embodiments.

In an embodiment, a processor (e.g., the processor 120 of FIG. 1) may display first content 2310 of an AOD screen on the display 210. The upper left end of the first content 2310 may be set as a random starting point.

In an embodiment, the processor 120 may perform a first movement to move the first content 2310 from the starting point based on a first rule every specified first time interval while the first content 2310 is displayed. The first rule may be a rule for setting a small jump of the first content 2310. When the position indicated by "0" is the random starting point, the processor 120 may start from "0" and may move the first content 2310 to the positions of 1, 2, 3, 4, 5, 6, 7, 8, and 9 every time a specified time interval elapses. For example, in the case of displaying a clock on the AOD screen, the processor 120 may move the upper left end of the clock to the positions of 0, 1, 2, 3, 4, 5, 6, 7, 8, and 9 every time one minute elapses after the clock is displayed as the AOD screen.

In an embodiment, the processor 120 may perform a second movement to move the first content 2310 from the starting point based on a specified second rule every specified second time interval. The second rule may be a rule for setting a big jump by which the first content 2310 is reorganized as second content 2320. The processor 120 may display the second content 2320 by reorganizing the first content 2310. For example, in the case of displaying a clock on the AOD screen, the processor 120 may move the upper left end of the clock to a new position on the display 210 every time ten minutes elapse after the clock is displayed as the AOD screen. The processor 120 may allow the AOD screen to be displayed as a whole on the display 210, thereby preventing degradation and/or burn-in of the display 210.

Figure 24:
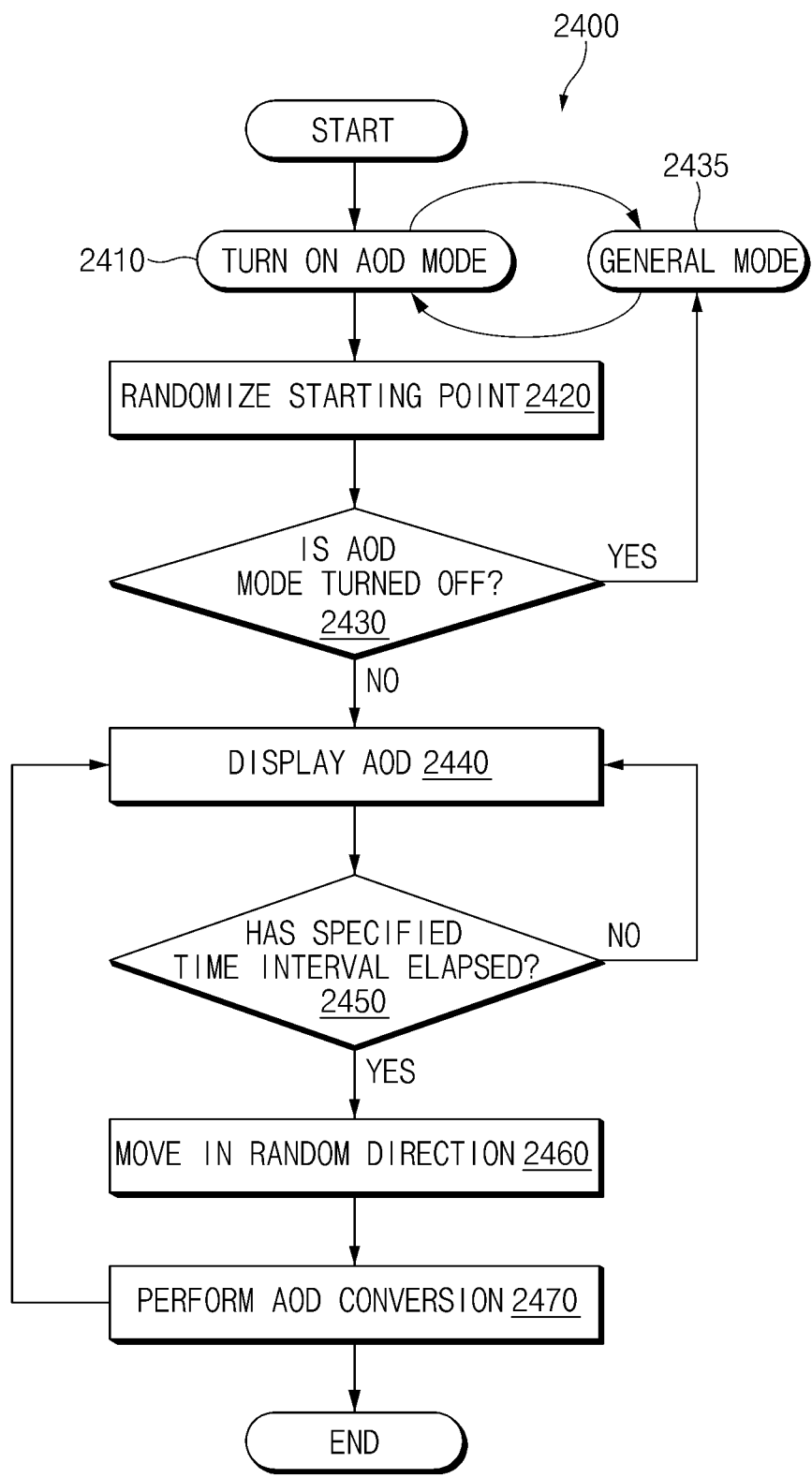
FIG. 24 is a flowchart illustrating an example method for displaying an AOD screen of a display of an electronic device according to various embodiments.

FIG. 24 is a flowchart 2400 illustrating an example method for displaying an AOD screen of a display (e.g., the display 210 of FIG. 2) of an electronic device (e.g., the electronic device 101 of FIG. 1) according to various embodiments.

In operation 2410, a processor (e.g., the processor 120 of FIG. 1) of the electronic device 101 according to the embodiment may turn on an AOD mode. In an inactive mode or a sleep mode (e.g., a low-power mode), the processor 120 may turn on the AOD mode (e.g., a low-power display mode) of the display 210. The processor 120 may display the AOD screen on the display 210 by turning on the AOD mode. When the electronic device 101 receives a user input, the processor 120 may switch the electronic device 101 from the AOD mode to a general mode.

In operation 2420, the processor 120 of the electronic device 101 according to the embodiment may randomize a starting point. The starting point may be a point at a specified position in the area displaying content of the AOD screen at the time when the AOD mode is turned on. For example, the starting point may be located at the upper left end of the area displaying the content of the AOD screen at the time when the AOD mode is turned on. The processor 120 may randomly set the position of the starting point.

In operation 2430, the processor 120 of the electronic device 101 according to the embodiment may determine whether the AOD mode is turned off. When the AOD mode is turned off (operation 2430—YES), the processor 120 may proceed to operation 2435. When the AOD mode is maintained in the turned-on state (operation 2430—NO), the processor 120 may proceed to operation 2440.

In operation 2435, the processor 120 of the electronic device 101 according to the embodiment may be switched to the general mode. In the general mode, the processor 120 may turn on the display 210 and may display an execution screen of an application (e.g., the application 146 of FIG. 1). When a specified period of time elapses in the state in which there is no user input to the electronic device 101, the processor 120 may switch the electronic device 101 from the general mode to the AOD mode.

In operation 2440, the processor 120 of the electronic device 101 according to the embodiment may display the AOD screen. The processor 120 may display the AOD screen on the display 210. The processor 120 may determine the luminance of the AOD screen and may display the AOD screen with the determined luminance.

In operation 2450, the processor 120 of the electronic device 101 according to the embodiment may determine whether a specified time interval has elapsed. The specified time interval may be a time interval for maintaining a degree of degradation and/or burn-in of the display 210 due to the AOD screen at a threshold value or less. For example, in the case of displaying a clock on the AOD screen, the processor 120 may determine whether one minute has elapsed after the AOD screen was displayed. The processor 120 may maintain operation 2440 until the specified time interval elapses (operation 2450—NO). The processor 120 may proceed to operation 2460 when the specified time interval elapses (operation 2450—YES).

In operation 2460, the processor 120 of the electronic device 101 according to the embodiment may move in a random direction. The processor 120 may move the AOD screen in any direction. For example, in the case of displaying a clock on the AOD screen, the processor 120 may move the AOD screen in any direction by a specified distance every time one minute elapses. Any direction may be an upper, lower, left, right, and/or diagonal direction. The specified distance may be substantially the same as the length and/or width of one pixel.

In operation 2470, the processor 120 of the electronic device 101 according to the embodiment may perform AOD conversion. The processor 120 may repeat operation 2440 by displaying the AOD screen at the position separated from the previous position in any direction by the specified distance.

In an embodiment, when threshold time elapses, the processor 120 may perform the AOD conversion. For example, in the case of displaying a clock on the AOD screen, the processor 120 may move the clock to the area maintained in a turned-off state on the display 210 every time one hour elapses after the clock is displayed as the AOD screen. The processor 120 may allow the AOD screen to be displayed as a whole on the display 210, thereby preventing degradation and/or burn-in of the display 210.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method for reducing degradation of a display of an electronic device configured to include a folded state, a flat state, and an intermediate state between the folded state and the flat state, the method comprising:
   determining whether the display is in a low-power display mode for displaying an always on display (AOD) screen;
   identifying content of a first screen displayed on the display based on the display displaying the AOD screen, the content including a first object including text and/or an image representing a clock, a date, and/or a battery state and a second object including notification received by the electronic device or transferred by the electronic device;
   detecting a folding angle of the display;
   determining whether a degree of burn-in of the display is less than or equal to a threshold value, based on the folding angle;
   generating a second screen, smaller than the first screen, by reorganizing the content of the first screen and reducing a size of the content of the first screen such that all of the content of the first screen is displayed on the second screen and does not overlap a folding axis of the display, based on the degree of burn-in being less than or equal to the threshold value; and
   displaying the second screen on the display.

2. The method of claim 1, wherein the second screen is generated by changing a brightness, color, position, arrangement relationship, and size of the content of the first screen while maintaining the content of the first screen, and
   wherein the first screen and the second screen display the AOD screen.

3. The method of claim 1, wherein the determining of whether the display is in the low-power display mode includes determining, by a processor of the electronic device, whether an event for switching the processor to a sleep state occurs.

4. The method of claim 1, wherein the identifying of the content of the first screen displayed on the display includes identifying, by a processor of the electronic device, a list of running applications.

5. The method of claim 1, wherein the detecting of the folding angle of the display includes:
   periodically obtaining the folding angle of the electronic device using a sensor module including a motion sensor and/or a magnetic force sensor; and
   transferring information related to the content displayed on the display to a processor of the electronic device in response to detecting a change of the folding angle.

6. The method of claim 1, wherein the generating of the second screen by reorganizing the first screen includes changing display characteristics of the first display.

7. The method of claim 1, wherein the generating of the second screen by reorganizing the first screen includes analyzing a physical property of the display.

8. The method of claim 1, wherein the display includes a plurality of areas divided with respect to the folding axis, and
wherein the generating of the second screen by reorganizing the first screen includes moving the AOD screen to one of the plurality of areas.

9. The method of claim 1, wherein the generating of the second screen by reorganizing the first screen includes moving the AOD screen such that the AOD screen does not overlap a folding axis of the display state,
wherein the first angle having a size greater than the second angle is an angle included in the flat state or the intermediate state.

10. The method of claim 1, wherein the second screen is generated by changing a brightness, color, position, arrangement relationship of the content of the first screen while maintaining the content of the first screen.

11. The method of claim 1, wherein the first screen and the second screen display the AOD screen.

12. A foldable electronic device configured to include a folded state, a flat state, and an intermediate state between the folded state and the flat state, the foldable electronic device comprising:
a display configured to display a screen;
at least one sensor configured to obtain a folding angle of the display; and
a processor operatively connected with the display and the at least one sensor,
wherein the processor is configured to:
determine whether the display is in a low-power display mode for displaying an always on display (AOD) screen;
identify content of a first screen displayed on the display based on the display displaying the AOD screen, the content including a first object including text and/or an image representing a clock, a date, and/or a battery state and a second object including notification received by the electronic device or transferred by the electronic device;
detect the folding angle of the display using the at least one sensor;
determine whether a degree of burn-in of the display is less than or equal to a threshold value, based on the folding angle;
generate a second screen, smaller than the first screen, by reorganizing the content of the first screen and reducing a size of the content of the first screen such that all of the content of the first screen is displayed on the second screen and does not overlap a folding axis of the display, based on degree of burn-in being less than or equal to the threshold value; and
control the display to display the second screen on the display.

13. The foldable electronic device of claim 12, wherein the processor is configured to determine whether an event for switching the processor to a sleep state occurs.

14. The foldable electronic device of claim 12, wherein the processor is configured to identify a list of running applications.

15. The foldable electronic device of claim 12, wherein the at least one sensor includes a motion sensor and/or a magnetic force sensor, and
wherein the processor is configured to:
periodically obtain the folding angle of the electronic device using the motion sensor and/or the magnetic force sensor; and
transfer information related to the content displayed on the display to the processor in response to detecting a change of the folding angle.

16. The foldable electronic device of claim 12, wherein the processor is configured to generate the second screen by changing a brightness, color, position, arrangement relationship of the content of the first screen while maintaining the content of the first screen.

17. The foldable electronic device of claim 12, wherein the first screen and the second screen display the AOD screen.

* * * * *